US010018851B2

(12) United States Patent
Soskind et al.

(10) Patent No.: US 10,018,851 B2
(45) Date of Patent: Jul. 10, 2018

(54) OPTICAL FIELD TRANSFORMATION METHODS AND SYSTEMS

(71) Applicants: Yakov Soskind, Plainsboro, NJ (US);
Michael Soskind, Plainsboro, NJ (US);
Rose Soskind, Plainsboro, NJ (US)

(72) Inventors: Yakov Soskind, Plainsboro, NJ (US);
Michael Soskind, Plainsboro, NJ (US);
Rose Soskind, Plainsboro, NJ (US)

( * ) Notice: Subject to any disclaimer, the term of this patent is extended or adjusted under 35 U.S.C. 154(b) by 74 days.

(21) Appl. No.: 14/826,435

(22) Filed: Aug. 14, 2015

(65) Prior Publication Data

US 2016/0048032 A1    Feb. 18, 2016

Related U.S. Application Data

(60) Provisional application No. 62/037,339, filed on Aug. 14, 2014.

(51) Int. Cl.
*G02B 27/00* (2006.01)
*G02B 27/09* (2006.01)
*G02B 27/42* (2006.01)

(52) U.S. Cl.
CPC ..... *G02B 27/4266* (2013.01); *G02B 27/0037* (2013.01); *G02B 27/0087* (2013.01); *G02B 27/0927* (2013.01); *G02B 27/0944* (2013.01)

(58) Field of Classification Search
CPC ........................ G02B 27/09; G02B 27/0927;
G02B 27/0938; G02B 27/0944; G02B 27/095; G02B 27/0955; G02B 27/0977; G02B 27/0983; G02B 27/0988; G02B 23/06

See application file for complete search history.

(56) References Cited

U.S. PATENT DOCUMENTS

| 3,527,526 | A  | 9/1970  | Silvertooth     |
|-----------|----|---------|-----------------|
| 4,439,012 | A  | 3/1984  | Christy         |
| 4,624,538 | A  | 11/1986 | MacFarlane      |
| 4,639,586 | A  | 1/1987  | Fender et al.   |
| 4,856,884 | A  | 8/1989  | Fender et al.   |
| 4,950,063 | A  | 8/1990  | Pohle et al.    |
| 5,138,484 | A  | 8/1992  | Schubert et al. |
| 6,404,547 | B1 | 6/2002  | Hull            |
| 7,009,764 | B1 | 3/2006  | Sigler et al.   |
| 7,504,609 | B2 | 3/2009  | Chen et al.     |
| 8,023,117 | B2 | 9/2011  | Rhoads          |

(Continued)

OTHER PUBLICATIONS

Y. Soskind, "Field Guide to Diffractive Optics", SPIE Press, 2011, p. 1 (2 pages total).

(Continued)

*Primary Examiner* — Kimberly N Kakalec
(74) *Attorney, Agent, or Firm* — Stuart H. Mayer; Mayer & Williams PC

(57) ABSTRACT

A method of performing coherent transformations of optical fields includes forming a far field distribution of the input optical field. A fraction of the formed far field is diffracted by producing localized discontinuities within said far field. A Fraunhofer diffraction pattern of the diffracted optical field is formed. The Fraunhofer diffraction pattern is modified by producing localized optical path differences within the Fraunhofer diffraction pattern. The transformed output optical field is produced in the far field with respect to the modified Fraunhofer diffraction pattern.

15 Claims, 26 Drawing Sheets

(56) References Cited

U.S. PATENT DOCUMENTS

Figure 1:
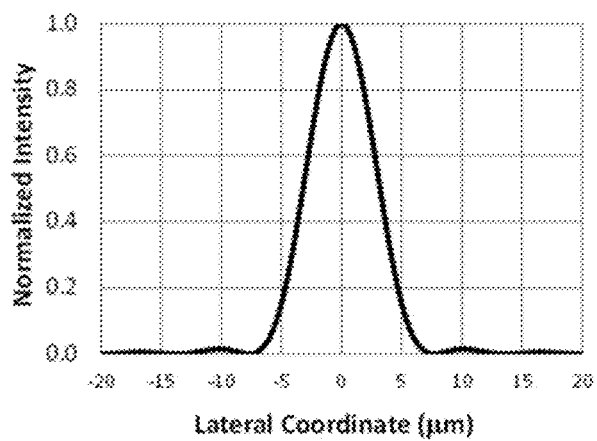

| | | | | |
|---|---|---|---|---|
| 8,325,417 B1* | 12/2012 | Kurti | ............... | G02B 26/06 |
| | | | | 359/483.01 |
| 2010/0188762 A1* | 7/2010 | Cook | ............... | G02B 27/0927 |
| | | | | 359/858 |
| 2015/0205137 A1* | 7/2015 | Soskind | ............ | G02B 27/0927 |
| | | | | 359/352 |

OTHER PUBLICATIONS

G. Toraldo di Francia, "Super-Gain Antennas and Optical Resolving Power," Il Nuovo Cimento, vol. IX, N. 3, pp. 426-438 (1952) (13 pages total).

Y. Soskind, "Field Guide to Diffractive Optics", SPIE Press, 2011, pp. 15, 16, 29-35 (7 pages total).

M. Soskind, R. Soskind, Y. G. Soskind, "Producing superresolved point-spread functions using a phase modulation technique", in Novel Optical Systems Design and Optimization XIII, Proceedings of SPIE vol. 7787, 77870T, 2010 (9 pages total).

W. M. Neubert, et. al., "Experimental demonstration of an optical phased array antenna for laser space communicaitons," Applied Optics, vol. 33, No. 18, pp. 3820-3830, 1994 (11 pages total).

T. Weyrauch, et. al., "Experimental demonstration of coherent beam combining over a 7 km propagation path," Optics Letters, vol. 36, pp. 4455-4457, 2011 (3 pages total).

J. W. Goodman, Introduction to Fourier Optics. 3rd Edition, Ch. 4, p. 75, Roberts & Co., 2005 (2 pages total).

M. A. Vorontsov, et. al., "Adaptive phase-distortion correction based on parallel gradient-descent optimization", Opt. Letters, vol. 22, pp. 907-909, 1997 (3 pages total).

\* cited by examiner

OPTICAL FIELD TRANSFORMATION METHODS AND SYSTEMS

I. FIELD OF THE INVENTION

The present invention relates to methods and systems employed for modification of optical fields. More specifically, it relates to methods and systems for transforming the shape and size of optical field distributions produced by optical systems.

II. BACKGROUND OF THE INVENTION

One of the most fundamental characteristics of imaging optical systems is the ability to produce sharp images of objects and to resolve fine details within these objects. On the other hand, non-imaging optical systems are often required to produce various output light patterns by transforming the propagating radiation. In several photonics applications, for example, it is required to produce high peak irradiance or radiance optical fields with complex, spatially structured radiation patterns.

An optical system's response to a point source, known as the point-spread function (PSF) of the optical system, represents one of the most fundamental characteristics of the optical system. The PSF defines a system's ability to form sharp images or to focus the propagating radiation. The PSF also influences radiance distributions produced by optical systems in the far field. An image of an object produced by an optical system is defined as the convolution of an ideal image with the PSF of the optical system producing the image. The PSF size depends on the radiation wavefront distortions incurred during propagation, including atmospheric effects, optical system aberrations, and diffraction of the radiation as it propagates through the optical system. In the case of optical systems well corrected for aberrations, the shape and size of the PSF is defined only by obscurations and diffraction effects on the system's apertures. Optical systems well corrected for aberrations are termed as "diffraction-limited." Diffraction effects limit the resolution of optical systems and prevent propagating radiation from being focused into infinitely small spots with infinitely high power densities.

When an object is located at infinity, a diffraction-limited optical system with a circular pupil aperture will produce a focused field distribution known as an Airy distribution in its back focal plane. The Airy distribution consists of a high intensity circular central node surrounded by lower intensity rings caused by diffraction on the pupil aperture. FIG. 1 shows a normalized intensity cross-section of an Airy distribution. The size of the central node of an Airy distribution, referred to as an Airy disk, depends on the wavelength $\lambda$ of the propagating radiation, the aperture diameter D, and the focal length f of the focusing optics. The Airy disk diameter is defined as:

$$d_{Airy} = 2.44 \frac{\lambda f}{D} = 2.44 \lambda N \tag{1}$$

where the ratio N=f/D is referred to in literature as the f-number of an optical system. The Airy disk contains about 84% of the propagating radiation power, while the remaining 16% of the radiation power is distributed between the lower intensity rings of the Airy distribution caused by diffraction of the radiation on the circular system aperture. Equation (1) also describes the central node size of a focused field distribution from a top-hat-shaped collimated laser beam with diameter D and wavelength $\lambda$ produced in the focal plane of a diffraction-limited focusing optical system with focal length f.

Figure 2:
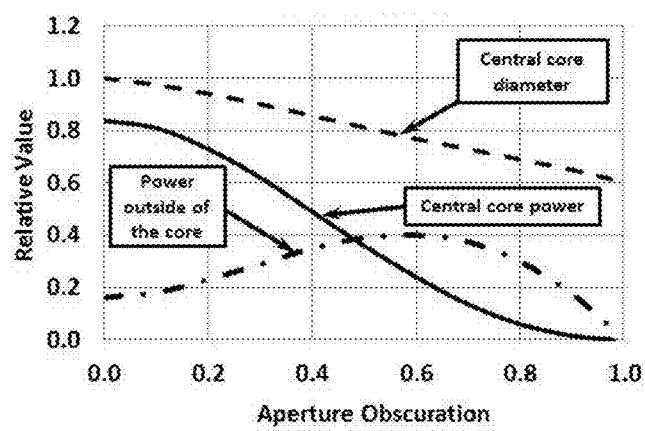

Amplitude transmission masks and phase masks were employed in the past to alter the size and shape of PSFs. FIG. 2 presents changes in the PSF central node diameter, the power outside of the central node, and the power contained in the central node for optical systems with central obscurations produced by opaque, axially-symmetric amplitude masks located at the pupil of the optical system. An increase in pupil obscuration by the amplitude mask leads to a reduction in the output field central node diameter, but at the same time causes an increase in the fractional power diffracted outside of the central node and an associated reduction in the fractional power contained in the central node. Pupil obscurations are produced, for example, by secondary mirrors in reflective telescopes, and result in PSFs with reduced central node widths and an increased amount of radiation diffracted outside of the central nodes.

The idea of using amplitude masks located at the pupil of an optical system to reduce the Airy disk width was first proposed by Toraldo di Francia in 1952. Since then, it has been demonstrated that amplitude and phase masks placed at the pupil of an optical system alter the system's PSF. Several examples of PSF distributions produced with the aid of amplitude and phase masks have been discussed in the past.

The optical path difference (OPD) introduced by phase mask structures is usually chosen to be equal to an odd integer j of half the wavelength $0.5\lambda$ of the propagating radiation:

$$OPD = j0.5\lambda \tag{2}$$

In many cases, the lowest integer value j=1 is employed, and the optical path difference introduced by the phase masks equals half the wavelength of the propagating radiation.

The employment of amplitude or phase masks to shape the PSF of an optical system is usually associated with a reduction in the fractional power contained within the PSF central node and the associated increase in fractional power contained outside of the PSF central node. It was previously shown that a reduction in the central node width is associated with a reduction in the fractional amount of power contained within the central node of a focused laser beam and with a respective increase in the fractional amount of power contained within the rings outside of the central node.

Figure 3:
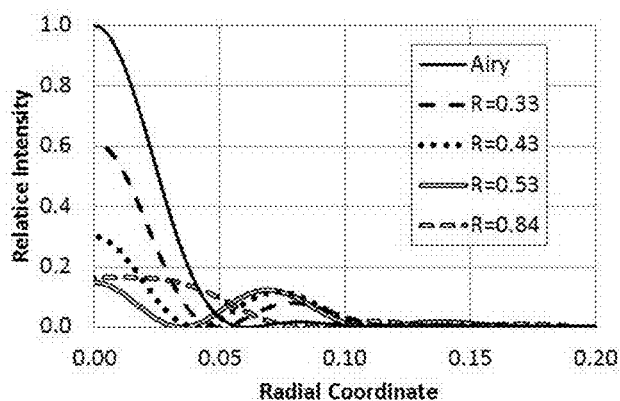
Figure 4:
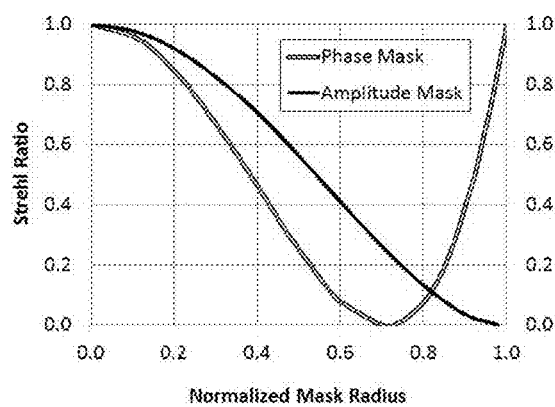

FIG. 3 presents the relative changes in PSF cross-sections for an Airy distribution, as well as for an optical system containing a pupil single-step phase mask with four different radial sizes of the phase zone. The ratio of the PSF peak intensity of an optical system employing amplitude or phase masks to the peak intensity of the Airy distribution is known as the Strehl ratio. FIG. 4 presents the calculated Strehl ratios for optical systems with amplitude and phase masks located at the system's pupils as a function of the masks' radial sizes. The figure indicates that the use of amplitude or phase masks to alter the PSF shape leads to reduced Strehl ratios. The reduction in Strehl ratio is, in turn, associated with the reduction in the fraction of radiation contained within the PSF central node and the respective increase in the fraction of the radiation contained outside of the PSF central node.

Figure 5:
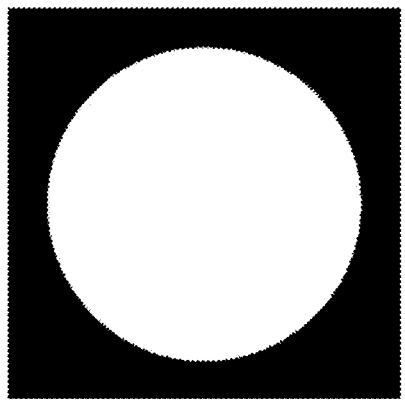
Figure 6:
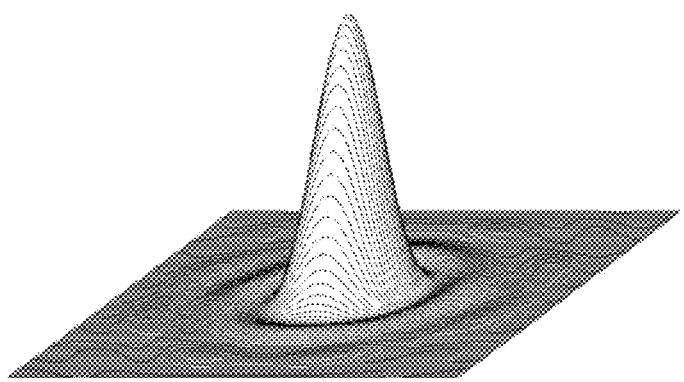

FIG. 5 presents a circular-shaped uniformly illuminated aperture of a diffraction-limited optical system. FIG. 6 presents the corresponding three-dimensional shape of the Airy PSF intensity distribution in the back focal plane of the diffraction-limited optical system using the aperture from FIG. 5.

Figure 7:
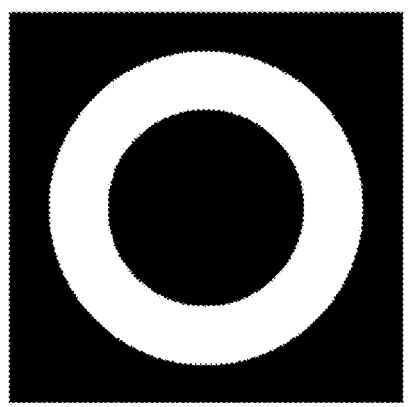
Figure 8:
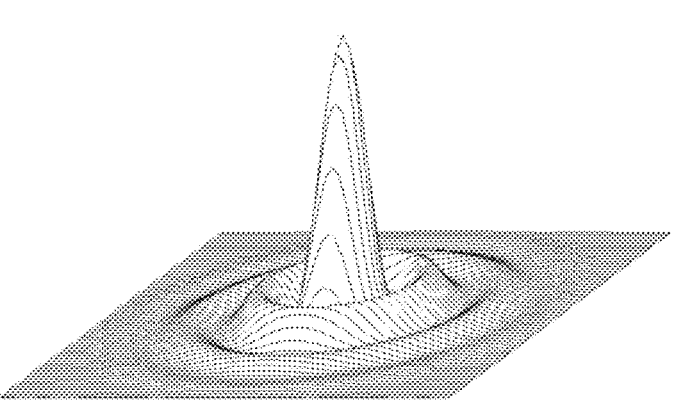

Optical systems with central obscurations are widely employed in reflective telescopes and result in PSFs containing diminished fractions of radiation within the PSF central node, as was shown in FIG. 2. FIG. 7 presents a doughnut-shaped uniformly illuminated aperture of an optical system with central obscuration. The radial size of the obscuration shown in FIG. 7 is about 60% of the aperture radius. FIG. 8 presents a three-dimensional shape of the PSF intensity distribution in the back focal plane of the optical system with central obscuration. The PSF of the system consists of a higher peak intensity central node surrounded by lower intensity rings caused by diffraction of the radiation on the doughnut-shaped system aperture. The PSF shown in FIG. 8 has a Strehl ratio of 0.41. The PSF contains 37.3% of the radiation within the central node, while 62.7% of the radiation is diffracted outside of the central node and is contained within the rings of the PSF.

Figure 9:
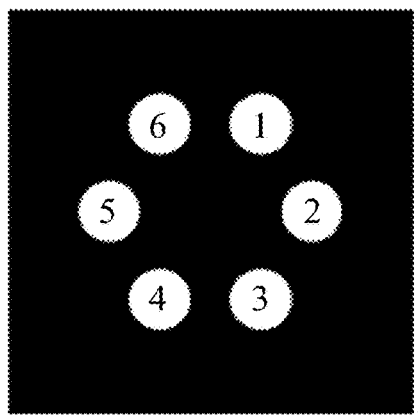
Figure 10:
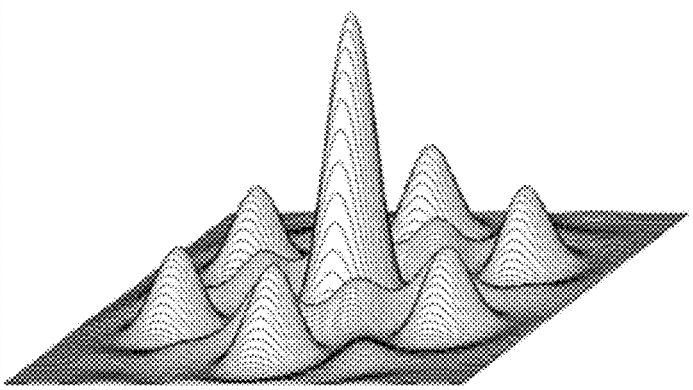

Optical systems with distributed apertures are composed of several spaced apart sub-apertures comprising the system's aperture, and are capable of producing PSF distributions with central node widths smaller than the central node widths of PSFs from individual sub-apertures. FIG. 9 presents the pupil of an optical system containing 6 distributed apertures. The individual apertures of the optical system in FIG. 9 are numbered clock-wise in ascending order. The PSF of an optical system with 6 distributed apertures shown in FIG. 9 consists of a higher peak intensity central node surrounded by a number of secondary lower intensity peaks caused by the diffraction of propagating radiation by the apertures, and is presented in FIG. 10. The PSF of the optical system with distributed apertures has a Strehl ratio of 0.31, and contains only about 20.7% of the propagating radiation within the central node, while 79.3% of the radiation is spread outside of the central node of the PSF. The central node width of the PSF in FIG. 10 is about 5.4 times narrower than the PSF central node widths of the individual sub-apertures comprising the system.

The fractional radiation content within the central node of a PSF produced by an optical system is further reduced if the propagating radiation encounters wavefront distortions. In the case of the optical systems with distributed apertures, the fractional power contained within the PSF central node will be reduced in the presence of wavefront distortions within the individual sub-apertures of the optical system, or when the OPD between the sub-apertures is not equal to an integer number of the radiation wavelength.

Figure 11:
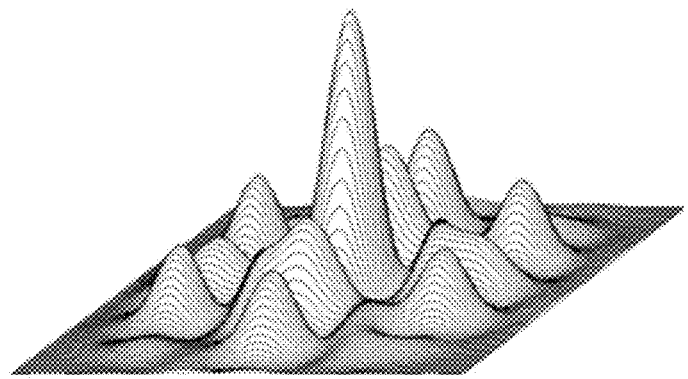
Figure 12:
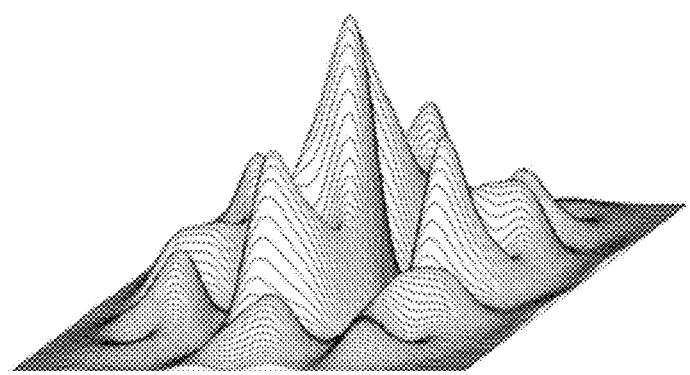

FIGS. 11 and 12 present PSFs of the optical system containing 6 distributed sub-apertures in the presence of wavefront distortions producing random OPDs between the individual sub-apertures. The PSF shown in FIG. 11 corresponds to a random set of OPDs ranging from −0.14λ to 0.15λ and listed as OPD set #1 in the second row of Table 1, where λ is the wavelength of the propagating radiation. The PSF in FIG. 11 had a Strehl ratio of 0.22 and contained 17.7% of the total radiation power within the area occupied by the central node of the undistorted PSF. The PSF shown in FIG. 12 corresponds to a second set of phase errors corresponding to random OPD set #2 and ranging from −0.35λ to 0.21λ OPD set #2 is shown in the third row of Table 1. The presence of these random phase errors between the individual sub-apertures resulted in a field distribution with a Strehl ratio of 0.16 containing only 12.9% of the total radiation power within the area occupied by the central node of the undistorted PSF.

TABLE 1

| | Aperture Number | | | | | |
|---|---|---|---|---|---|---|
| | 1 | 2 | 3 | 4 | 5 | 6 |
| OPD Set #1 (λ) | −0.11 | 0.15 | −0.06 | 0.02 | 0.07 | −0.14 |
| OPD Set #2 (λ) | −0.19 | 0.10 | 0.21 | 0.17 | −0.35 | −0.05 |

A combination of multiple coherent laser beams into an array, known as an Optical Phased Array (OPA), results in a far field distribution with a central node size significantly smaller than the far field central nodes produced by the individual laser beams. This reduction in the OPA far field central node size is achieved at the penalty of a significant reduction in the fractional radiation power contained within the OPA central node.

Figure 13:
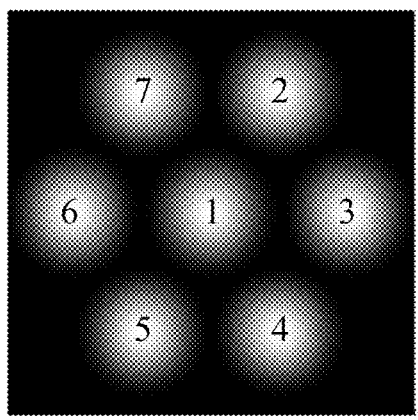
Figure 14:
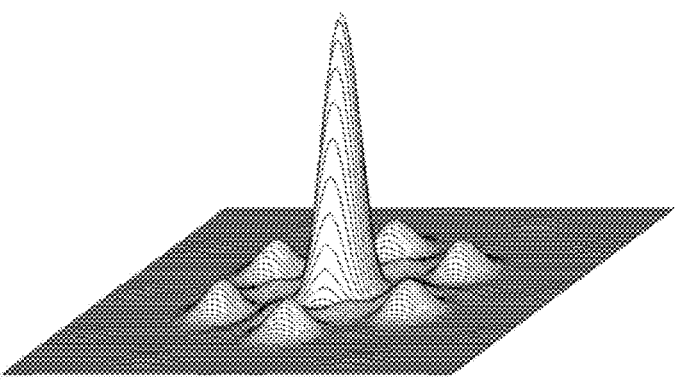

The far field distributions are produced at distances L from the OPA that satisfy the far field condition:

$$L > \frac{2(D_{OPA})^2}{\lambda}$$

where λ is the OPA wavelength, and $D_{OPA}$ is the OPA aperture diameter. Alternatively, the far field distributions can be produced in the focal plane of a lens. OPAs may contain different numbers of individual laser beams and may be arranged into different patterns, with the individual beams taking different sizes and shapes, including Gaussian, super-Gaussian, top-hat, etc. FIG. 13 shows the near field intensity distribution produced by an OPA containing seven Gaussian-shaped coherent laser beams arranged in a circular-symmetric pattern. The individual OPA beams are sequentially labeled 1 through 7, as shown in the figure. FIG. 14 presents the far field irradiance distribution produced by the OPA in the absence of wavefront distortions and phase errors between the laser beams. The far field pattern shown in FIG. 14 contains within the central node about 56% of the total OPA power and has a Strehl ratio of 0.56.

Figure 15:
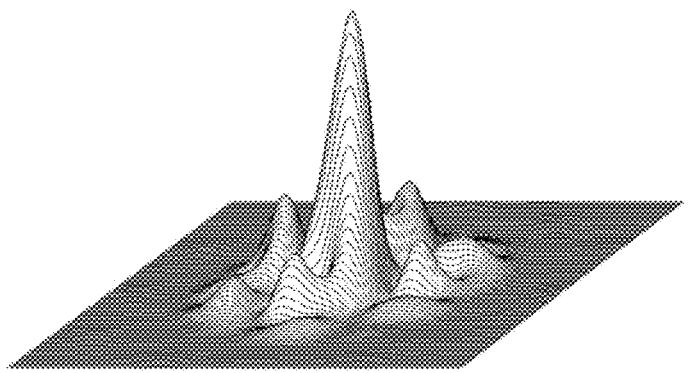

In the presence of wavefront distortions or OPDs between the individual laser beams within the array, the fractional OPA power contained within the central node of the far field is reduced. FIG. 15 presents the far field from the OPA in the presence of random OPDs between the individual beams within the array ranging from −0.35λ to 0.21λ. The specific OPDs associated with the individual OPA laser beams are shown in the second row of Table 2. The far field in FIG. 15 has the peak value reduced to 0.53 of the respective peak value of the far field containing no phase errors. The far field in the presence of the phase errors has a Strehl ratio of 0.30 and contains only 37% of the total radiation power within the central node.

TABLE 2

| | Beam Number | | | | | | |
|---|---|---|---|---|---|---|---|
| | 1 | 2 | 3 | 4 | 5 | 6 | 7 |
| OPDs (λ) | −0.08 | −0.19 | 0.10 | 0.21 | 0.17 | −0.35 | −0.05 |

III. SUMMARY OF THE INVENTION

In accordance with one aspect of the invention, optical field transformation techniques are provided that can alter the shape and size of PSFs produced by optical systems, as well as the shape and size of the far field distributions produced by laser beams and their combinations.

In accordance with another aspect of the invention, optical field transformation techniques are provided that can redistribute fractional power within the central nodes of PSFs or optical far field distributions.

In accordance with still another aspect of the invention, optical field transformation techniques are provided that can redistribute the radiation between the central node and the side-lobes of PSFs or optical far field distributions.

In accordance with still another aspect of the invention, optical field transformation techniques are provided that can increase the peak intensity of the central nodes of PSFs or optical far field distributions.

In accordance with still another aspect of the invention, optical field transformation techniques are provided that can increase the fraction of the propagating radiation contained within the central nodes of PSFs of optical far field distributions.

In accordance with still another aspect of the invention, optical field transformation techniques are provided that can increase the peak intensity of central nodes of PSFs or optical far field distributions in the presence of wavefront distortions of the incoming optical radiation.

In accordance with still another aspect of the invention, optical field transformation techniques are provided that can increase the fraction of the propagating radiation contained within the central nodes of PSFs or optical far field distributions in the presence of wavefront distortions of the incoming optical radiation.

In accordance with still another aspect of the invention, optical field transformation techniques are provided that can reduce distortions of the incoming optical radiation.

In accordance with still another aspect of the invention, optical systems are provided for implementation of the above identified optical field transformation techniques.

In accordance with the present invention, the optical fields are subjected to optical transformations resulting in the formation of modified fields that satisfy the above identified aspects. By an appropriate selection of the optical properties of components employed during the field transformations, significant flexibility in changing the shape, size, fractional power, and peak intensity of the central node of the optical far field is realized. For example, during the field transformations in accordance with the present invention, a variety of different shapes and sizes of the transformed output field can be achieved, The aspects of the present invention are achieved in accordance with implementation techniques and design examples, as will be explained in detail in the following embodiments.

The features of the present invention, including the construction and operational details of the preferred embodiments, will now be described with reference to the accompanying drawings.

IV. BRIEF DESCRIPTION OF THE DRAWINGS

FIG. 1 presents a normalized intensity cross-section of an Airy field distribution.

FIG. 2 presents changes in PSF characteristics for optical systems with central obscurations.

FIG. 3 presents relative changes in PSF cross-sections for optical systems with pupil phase masks.

FIG. 4 presents Strehl ratios for optical systems with amplitude and phase masks as a function of the masks' radial sizes.

FIGS. 5 and 6 present the near field and the far field intensity distributions, respectively, for a diffraction-limited optical system with a circular-shaped uniformly illuminated pupil.

FIGS. 7 and 8 present the near field and the far field intensity distributions, respectively, for a diffraction-limited optical system with a doughnut-shaped uniformly illuminated pupil.

FIG. 9 presents the near field intensity distributions for an optical system containing input apertures arranged in a circular pattern.

FIGS. 10 through 12 present the far field intensity distributions of an optical system with the near field distribution shown in FIG. 9, for different wavefront distortions of the incoming field.

FIG. 13 presents the near field intensity distribution of an OPA comprised of seven circular-shaped laser beams with Gaussian intensity profiles.

FIGS. 14 and 15 present the far field intensity distributions of an OPA comprised of seven circular-shaped laser beams with Gaussian intensity profiles for different wavefront distortions of the propagating beams.

FIGS. 16 through 23 present examples of two-dimensional patterns employed to diffract a fraction of the optical field in accordance with the present invention.

Figure 24:
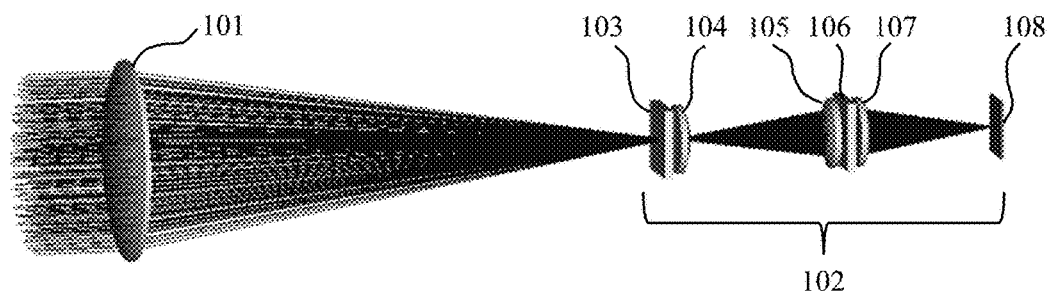

FIG. 24 presents an optical layout of the first embodiment of the present invention.

Figure 25:
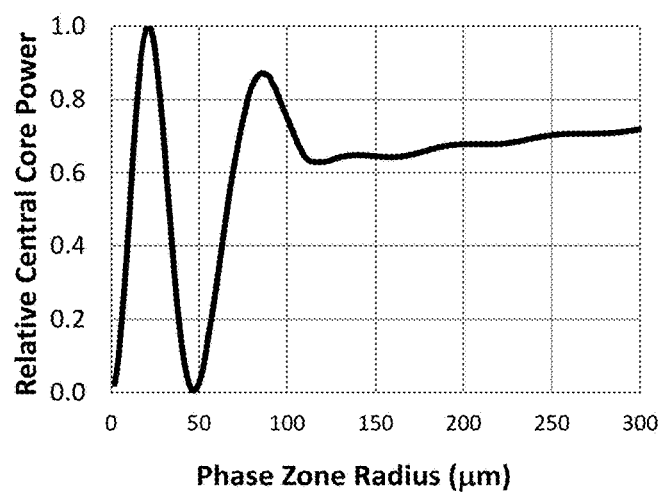

FIG. 25 presents the relative power contained within the central node of the transformed output field as a function of the phase zone radius in accordance with the first embodiment of the present invention.

Figure 26:
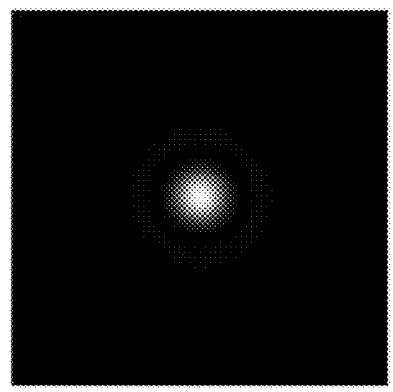

FIG. 26 presents the two-dimensional intensity distribution of the optical field in the back focal plane of the optical system 101 in accordance with the first embodiment of the present invention.

Figure 27:
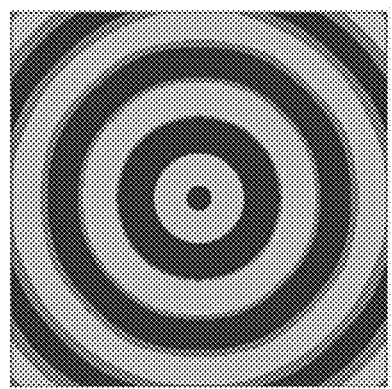

FIG. 27 presents the two-dimensional phase distribution of the optical field in the back focal plane of the optical system 101 after modification by the first phase structure in accordance with the first embodiment of the present invention.

Figure 28:
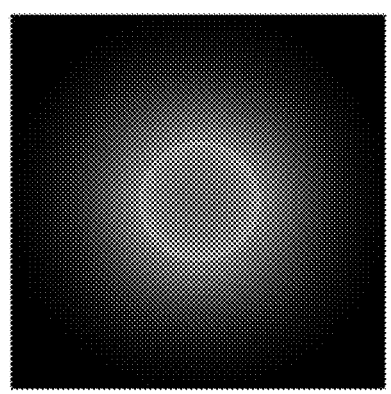
Figure 29:
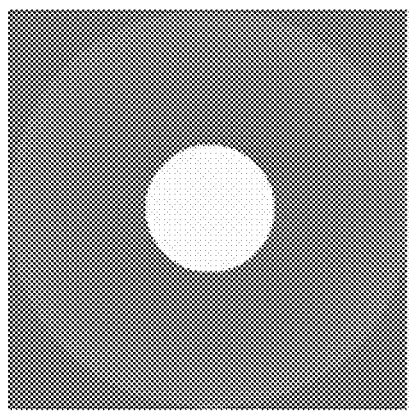

FIGS. 28 and 29 present the respective two-dimensional intensity and phase distributions of the modified optical field in the Fraunhofer region in accordance with the first embodiment of the present invention.

Figure 30:
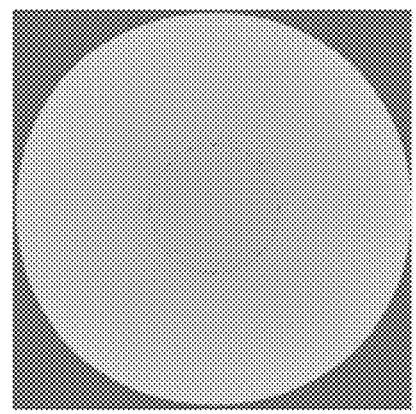

FIG. 30 presents the two-dimensional phase distribution of the modified optical field in the Fraunhofer region after additional modification by the second phase structure in accordance with the first embodiment of the present invention.

Figure 31:
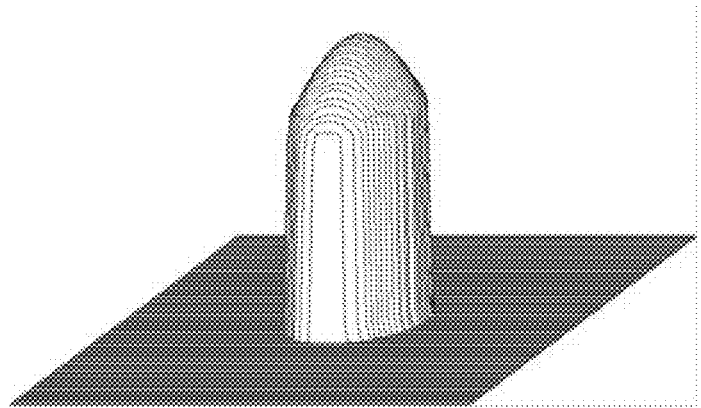
Figure 32:
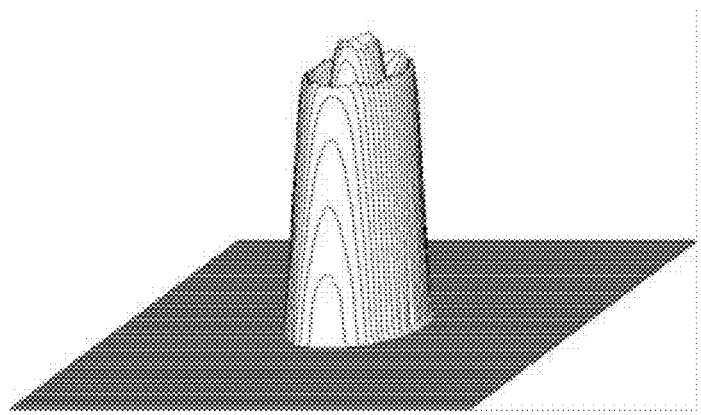

FIGS. 31 and 32 present the three-dimensional intensity distributions of the transformed optical field in accordance with the first embodiment of the present invention.

Figure 33:
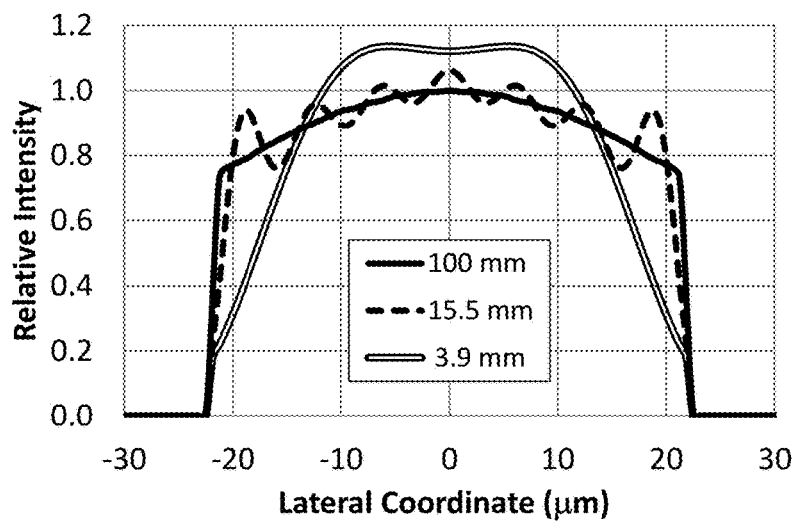

FIG. 33 presents axial cross-sections of the relative intensity distributions of the transformed optical field for three aperture radii of the output lens in accordance with the first embodiment of the present invention.

Figure 34:
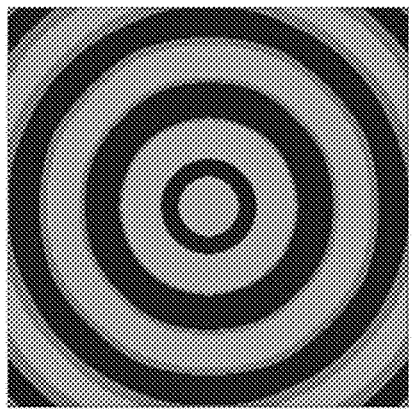

FIG. 34 presents the two-dimensional phase distribution of the optical field in the back focal plane of the optical system 101 after modification by the first phase structure in accordance with the first embodiment of the present invention.

Figure 35:
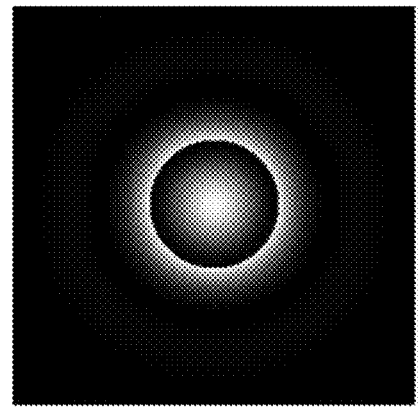

FIG. 35 presents the two-dimensional intensity distribution of the diffracted optical field in the Fraunhofer region in accordance with the first embodiment of the present invention.

Figure 36:
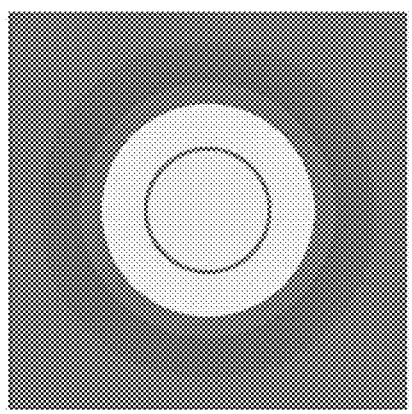

FIG. 36 presents the two-dimensional phase distribution of the diffracted optical field in the Fraunhofer region in accordance with the first embodiment of the present invention.

Figure 37:
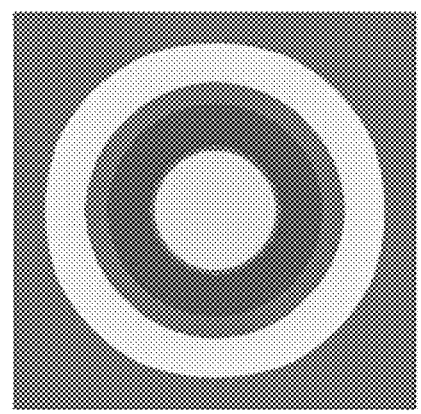

FIG. 37 presents the two-dimensional phase distribution of the diffracted optical field in the Fraunhofer region, after modification by the second phase structure in accordance with the first embodiment of the present invention.

Figure 38:
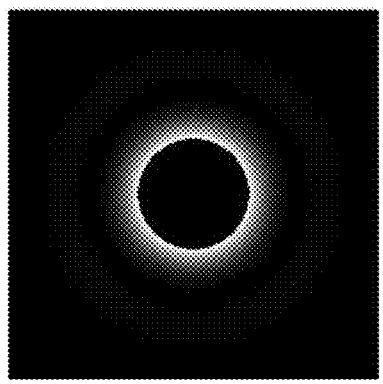

FIG. 38 presents the two-dimensional intensity distribution of the transformed optical field in accordance with the first embodiment of the present invention.

Figure 39:
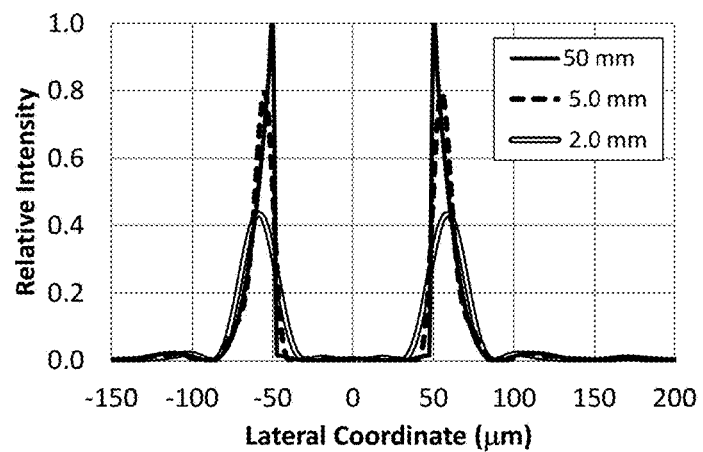

FIG. 39 presents the axial cross-sections of the intensity distributions of the transformed optical field in the output plane 108 for three aperture radii of the output lens in accordance with the first embodiment of the present invention.

Figure 40:
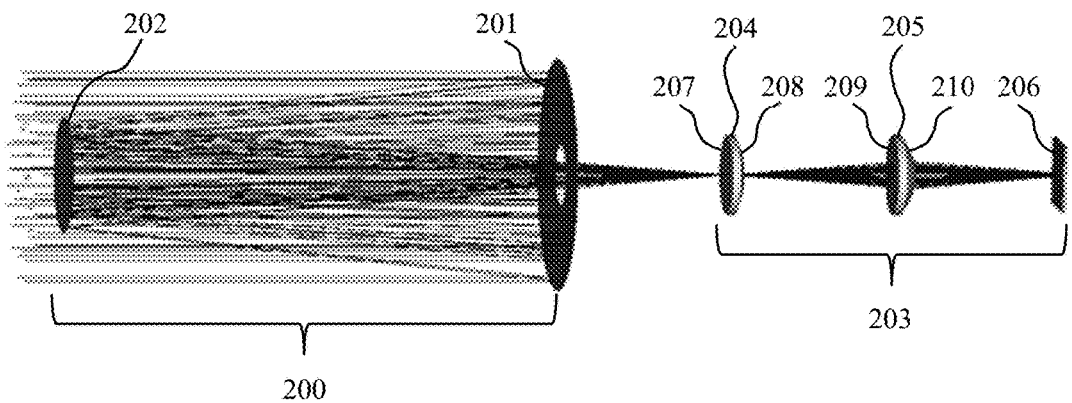

FIG. 40 presents an optical layout of the second embodiment of the present invention.

Figure 41:
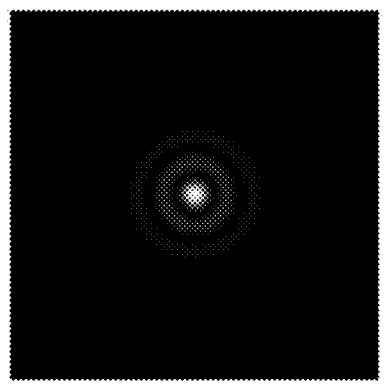

FIG. 41 presents the two-dimensional intensity distribution of the original PSF produced by the optical system with central obscuration in accordance with the second embodiment of the present invention.

Figure 42:
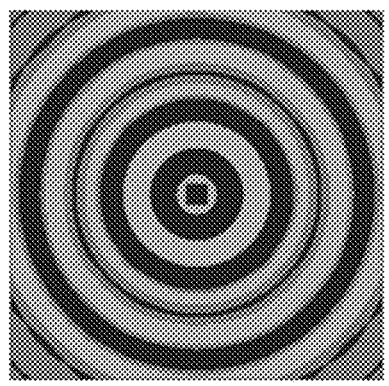

FIG. 42 presents the two-dimensional phase distribution of the PSF after modification by the first phase structure in accordance with the second embodiment of the present invention.

Figure 43:
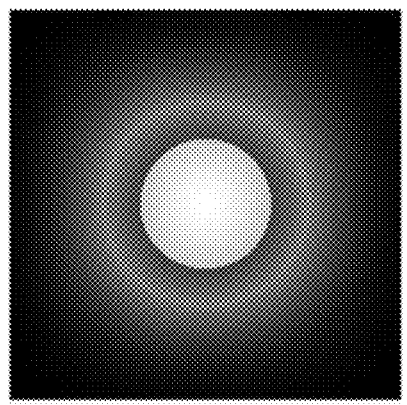

FIG. 43 presents the two-dimensional intensity distribution of the modified PSF in the Fraunhofer region in accordance with the second embodiment of the present invention.

Figure 44:
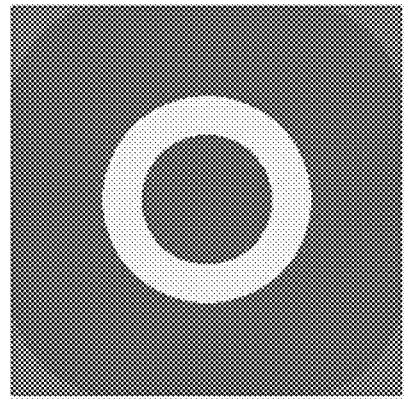

FIG. 44 presents the two-dimensional phase distributions of the modified PSF in the Fraunhofer region in accordance with the second embodiment of the present invention.

Figure 45:
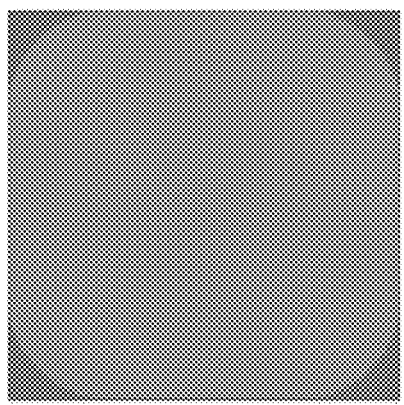

FIG. 45 presents the phase distribution of the modified PSF in the Fraunhofer region after additional modification by the second phase structure in accordance with the second embodiment of the present invention.

Figure 46:
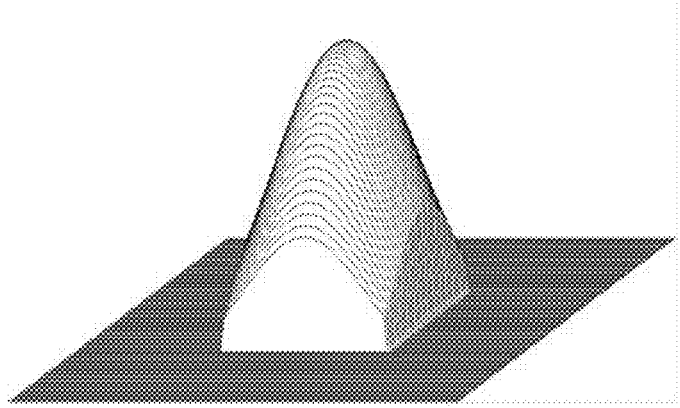
Figure 47:
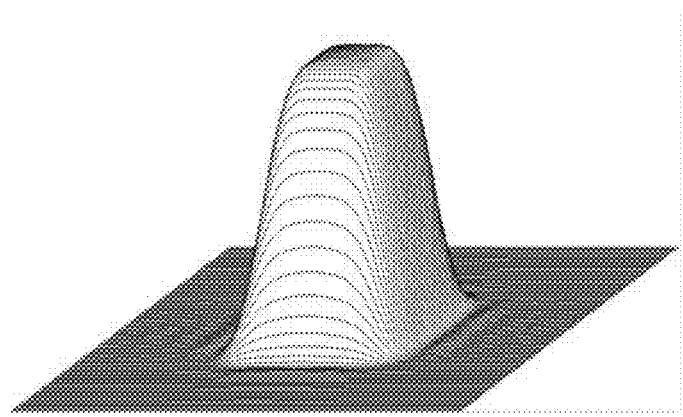
Figure 48:
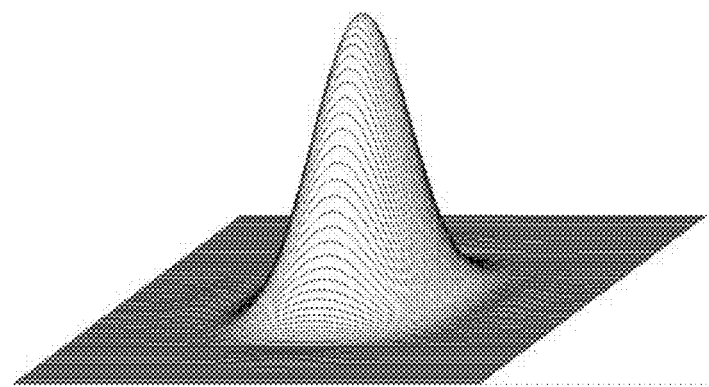
Figure 49:
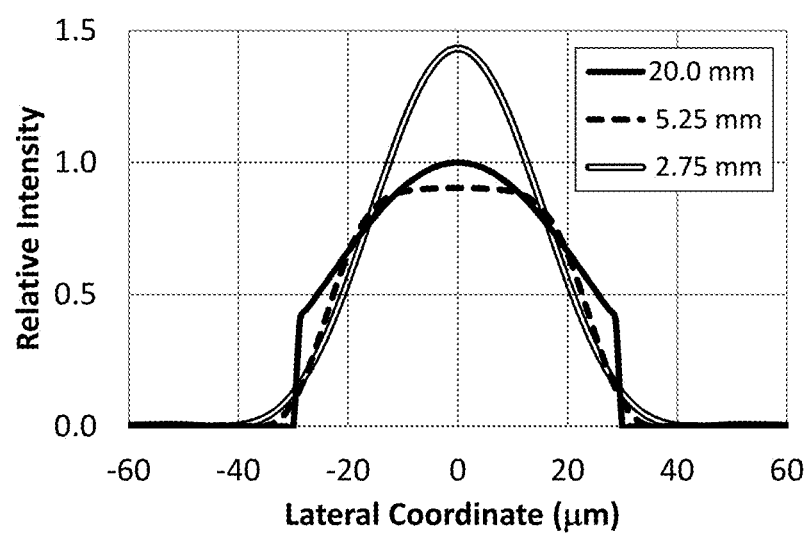

FIGS. 46 through 48 present three-dimensional intensity distributions of the transformed PSF in accordance with the second embodiment of the present invention FIG. 49 presents axial cross-sections of the relative intensity distributions of the transformed PSF for three aperture radii of the output lens in accordance with the second embodiment of the present invention.

Figure 50:
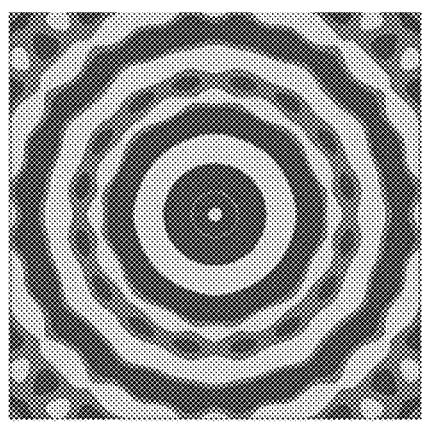

FIG. 50 presents the two-dimensional phase distributions of the PSF after modification by the first phase structure in accordance with the second embodiment of the present invention.

Figure 51:
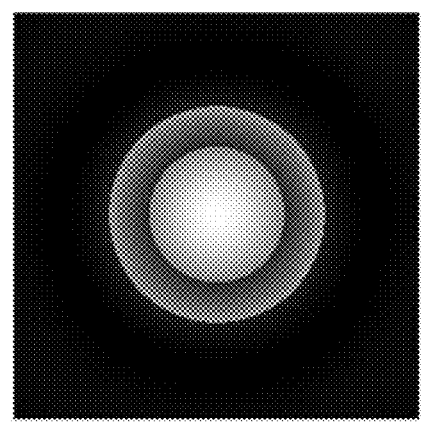

FIG. 51 presents the two-dimensional intensity distribution of the modified PSF in the Fraunhofer region in accordance with the second embodiment of the present invention.

Figure 52:
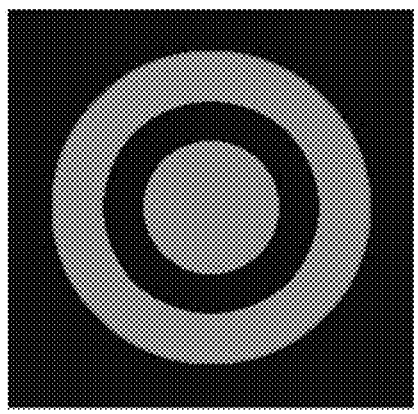

FIG. 52 presents the two-dimensional phase distribution of the modified PSF in the Fraunhofer region in accordance with the second embodiment of the present invention.

Figure 53:
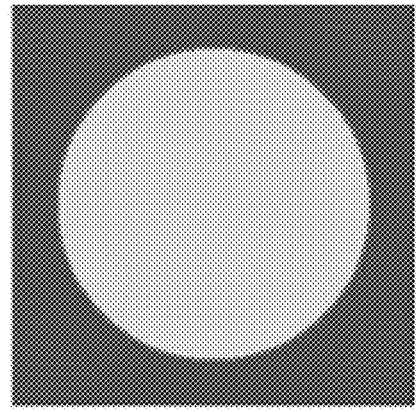

FIG. 53 presents the phase distribution of the modified PSF in the Fraunhofer region after additional modification by the second phase structure in accordance with the second embodiment of the present invention.

Figure 54:
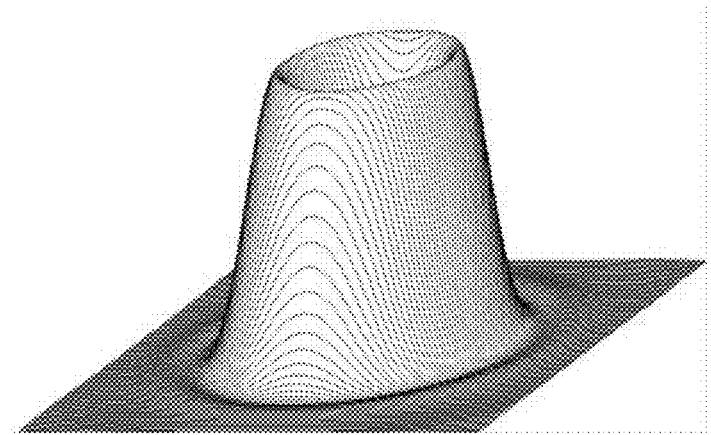

FIG. 54 presents the three-dimensional intensity distributions of the transformed PSF in accordance with the second embodiment of the present invention.

Figure 55:
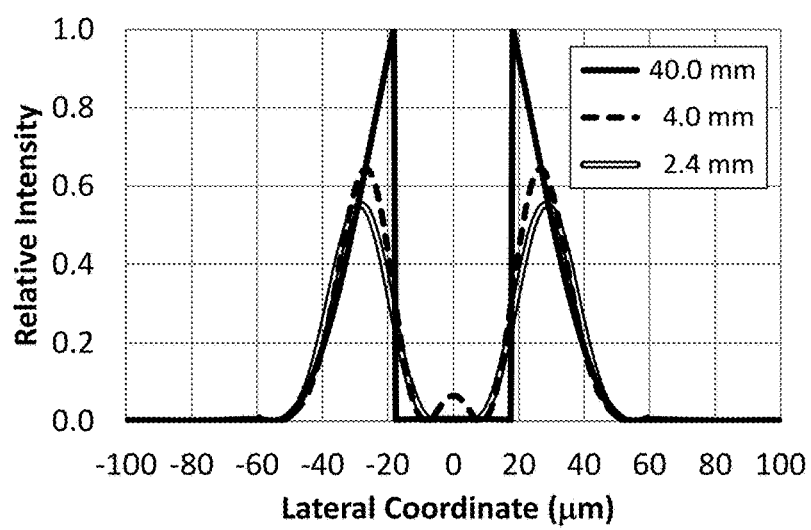

FIG. 55 presents the axial intensity cross-sections of the transformed PSF for three aperture radii of the output lens in accordance with the second embodiment of the present invention.

Figure 56:
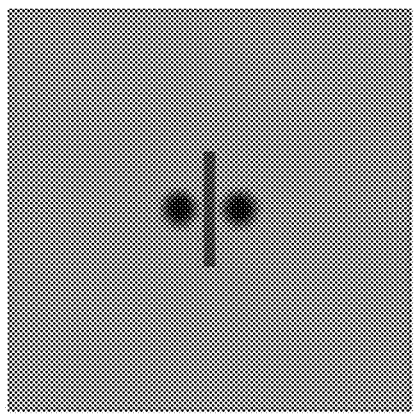

FIG. 56 presents the phase pattern of the first phase structure in accordance with the second embodiment of the present invention.

Figure 57:
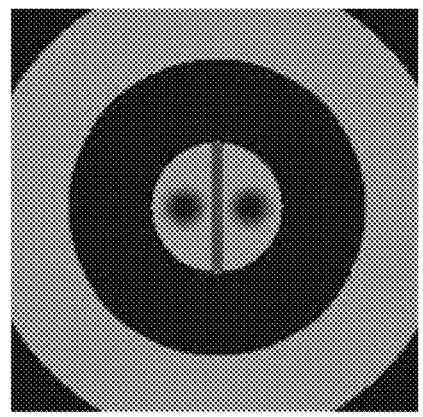

FIG. 57 presents the two-dimensional phase distribution of the PSF after modification by the first phase structure in accordance with the second embodiment of the present invention.

Figure 58:
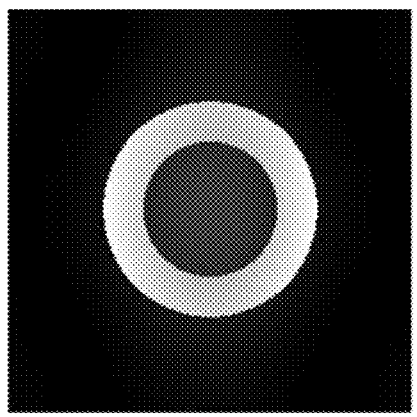

FIG. 58 presents the two-dimensional intensity distribution of the modified PSF in the Fraunhofer region in accordance with the second embodiment of the present invention.

Figure 59:
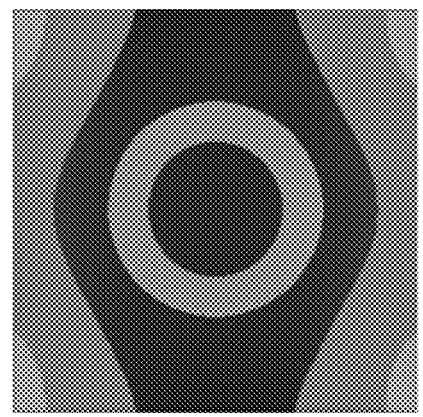

FIG. 59 presents the two-dimensional phase distribution of the modified PSF in the Fraunhofer region in accordance with the second embodiment of the present invention.

Figure 60:
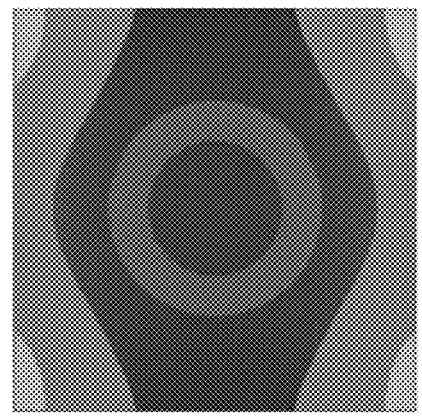

FIG. 60 presents the phase distribution of the modified PSF in the Fraunhofer region after additional modification by the second phase structure in accordance with the second embodiment of the present invention.

Figure 61:
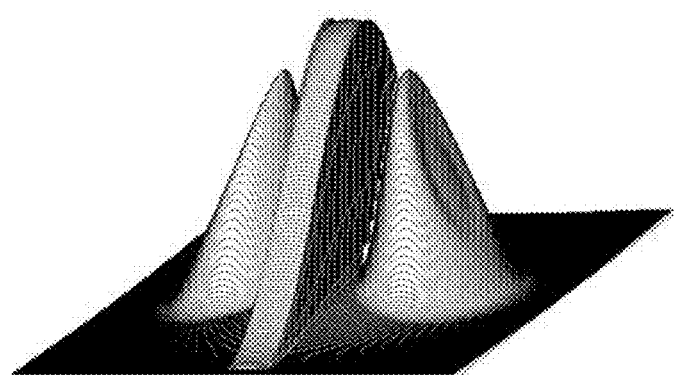

FIG. 61 presents the three-dimensional intensity distributions of the transformed output field in accordance with the second embodiment of the present invention.

Figure 62:
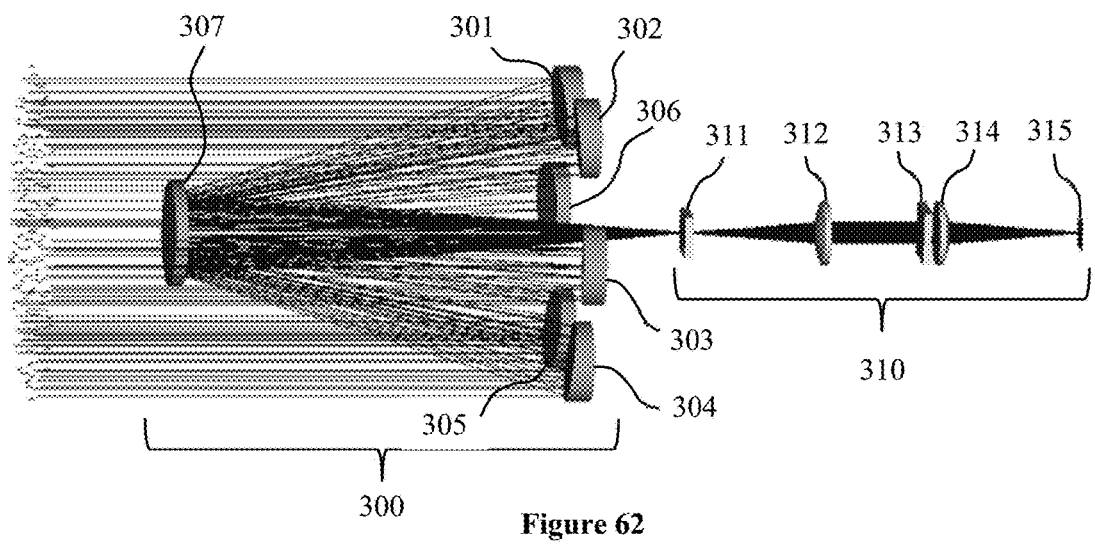

FIG. 62 presents an optical layout of the third embodiment of the present invention.

Figure 63:
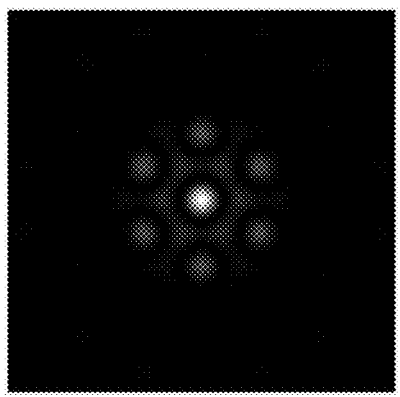

FIG. 63 presents the two-dimensional intensity distribution of the focused optical field in accordance with the third embodiment of the present invention.

Figure 64:
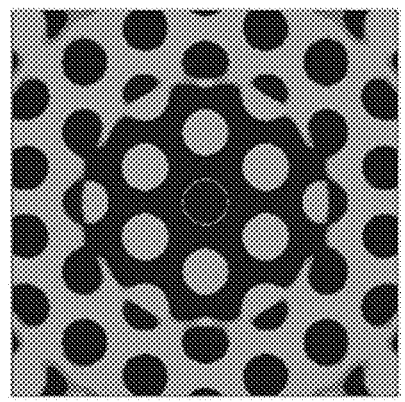

FIG. 64 presents the two-dimensional phase distribution of the focused optical field after modification by the first phase structure in accordance with the third embodiment of the present invention.

Figure 65:
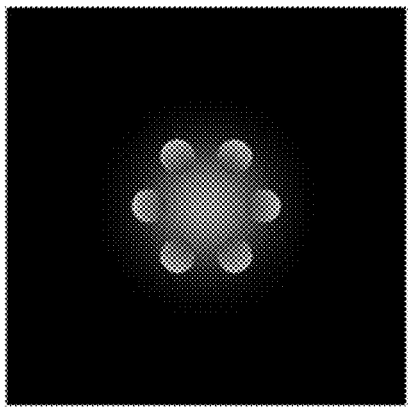

FIG. 65 presents the two-dimensional intensity distribution of the modified optical field in the Fraunhofer region in accordance with the third embodiment of the present invention.

Figure 66:
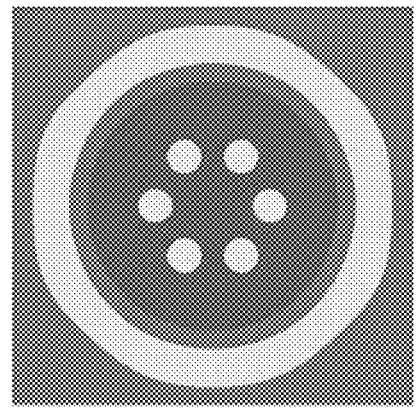

FIG. 66 presents the two-dimensional phase distribution of the modified optical field in the Fraunhofer region in accordance with the third embodiment of the present invention.

Figure 67:
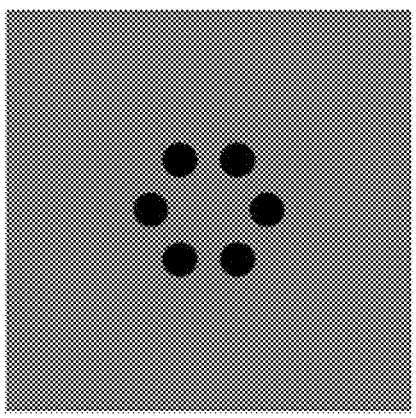

FIG. 67 presents the phase distribution of the second phase structure in accordance with the third embodiment of the present invention.

Figure 68:
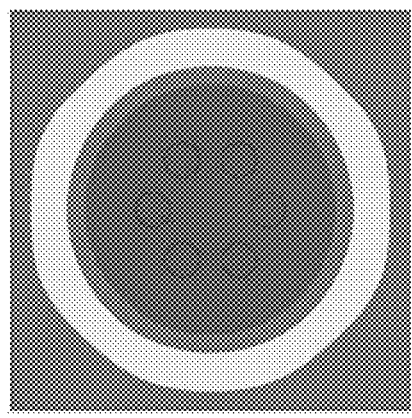

FIG. 68 presents the resulting two-dimensional phase distribution of the modified optical field in the Fraunhofer region after additional modifications by the second phase structure in accordance with the third embodiment of the present invention.

Figure 69:
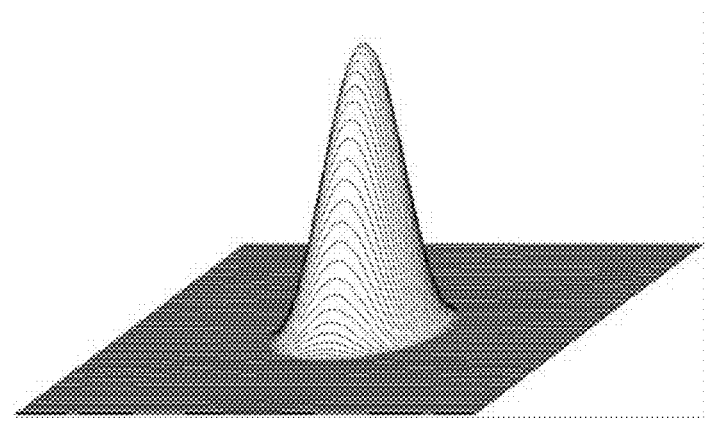
Figure 70:
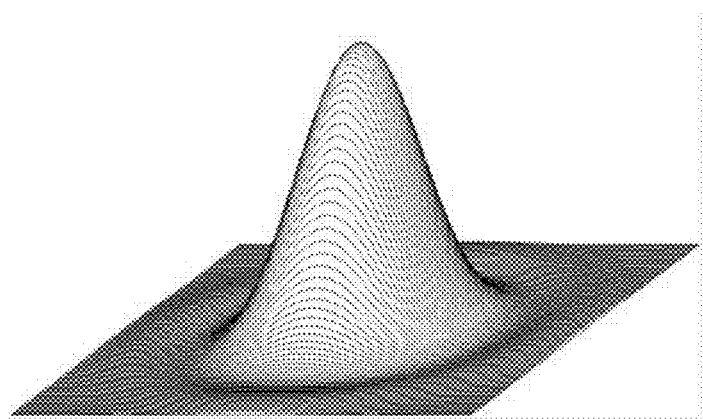

FIGS. 69 and 70 present the three-dimensional intensity distributions of the transformed optical field in the Fraunhofer region in accordance with the third embodiment of the present invention.

Figure 71:
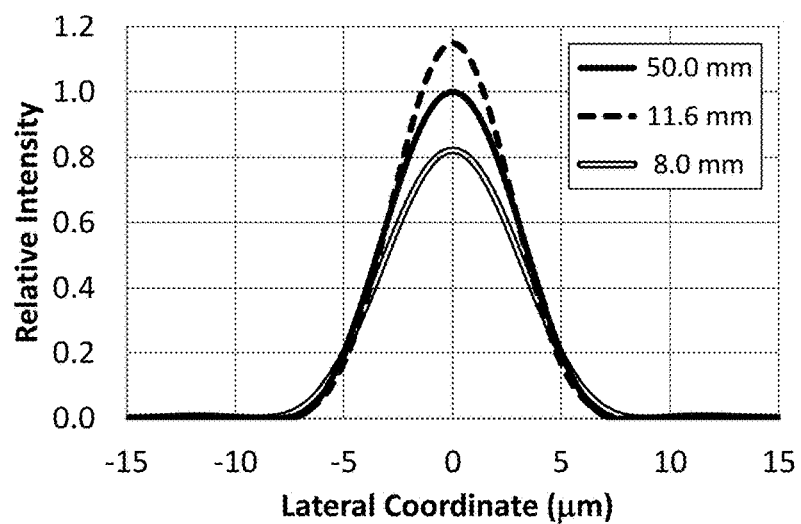

FIG. 71 presents the relative intensity cross-sections of the transformed output field for three aperture radii values of the output lens in accordance with the third embodiment of the present invention.

Figure 72:
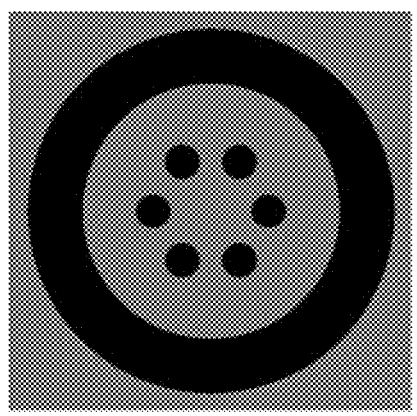

FIG. 72 presents the two-dimensional phase distribution of the second phase structure in accordance with the third embodiment of the present invention.

Figure 73:
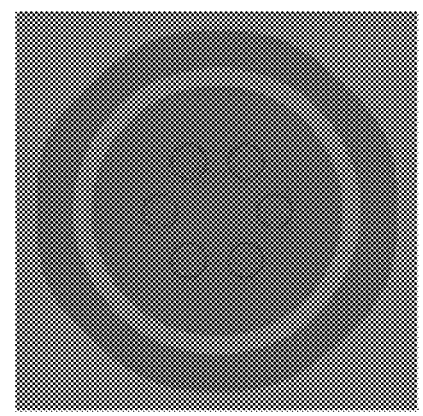

FIG. 73 presents the two-dimensional phase distribution of the optical field in the Fraunhofer region after modifications by the second phase structure in accordance with the third embodiment of the present invention.

Figure 74:
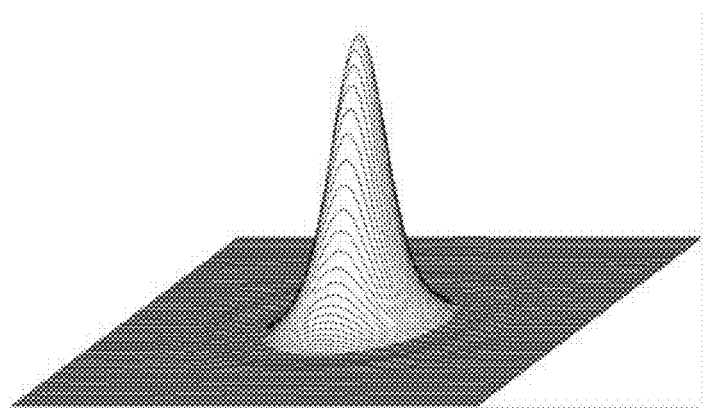
Figure 75:
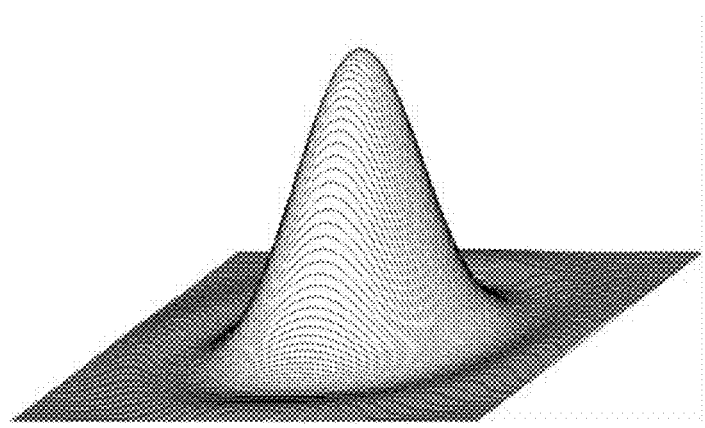

FIGS. 74 and 75 present the three-dimensional intensity distributions of the transformed output field in accordance with the third embodiment of the present invention.

Figure 76:
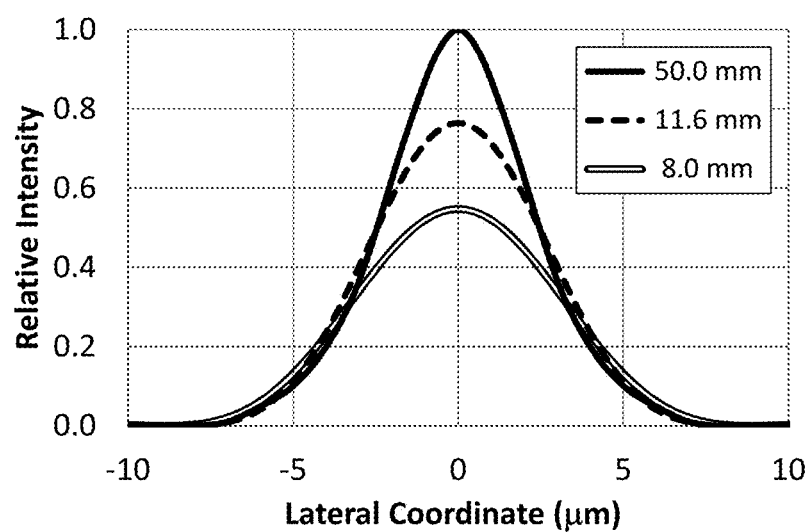

FIG. 76 presents the relative intensity cross-sections of the transformed output field for three aperture radii values of the output lens in accordance with the third embodiment of the present invention.

Figure 77:
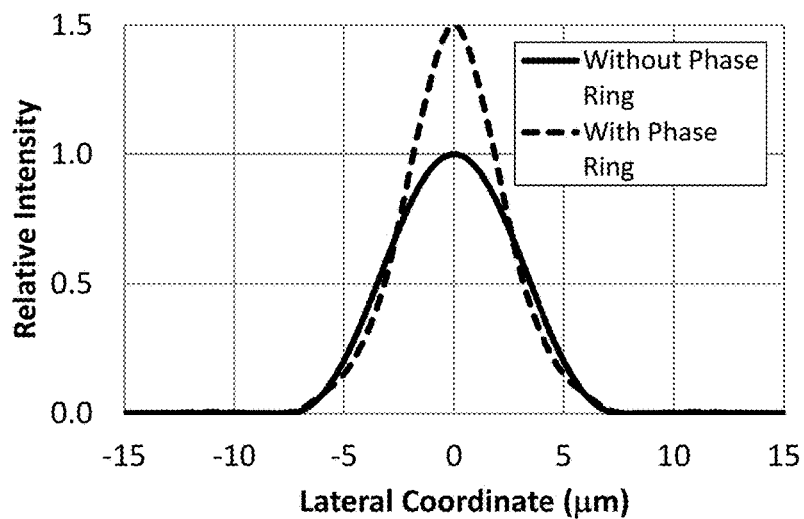

FIG. 77 presents the relative intensity cross-sections of the transformed output fields produced with the output lens employing a 50.0 mm aperture radius in accordance with the third embodiment of the present invention.

Figure 78:
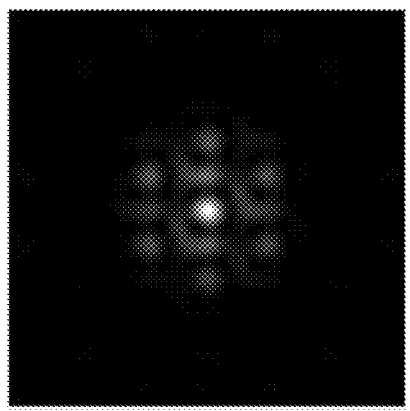

FIG. 78 presents the two-dimensional intensity distribution of the focused optical field in the presence of wavefront distortions at the system input in accordance with the third embodiment of the present invention.

Figure 79:
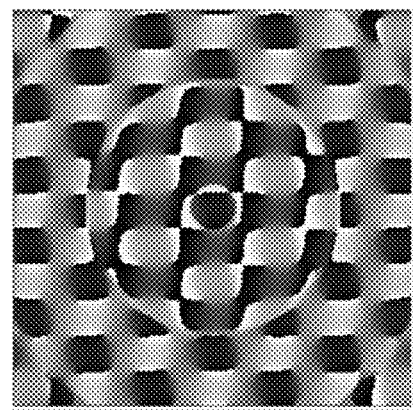

FIG. 79 presents the two-dimensional phase distribution of the focused optical field in the presence of wavefront distortions at the system input after modification by the first phase structure in accordance with the third embodiment of the present invention.

Figure 80:
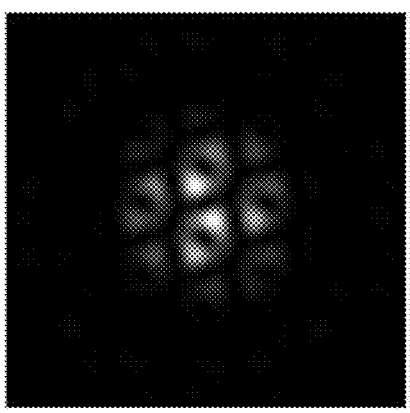

FIG. 80 presents the two-dimensional intensity distribution of the focused optical field in the presence of alternative wavefront distortions at the system input in accordance with the third embodiment of the present invention.

Figure 81:
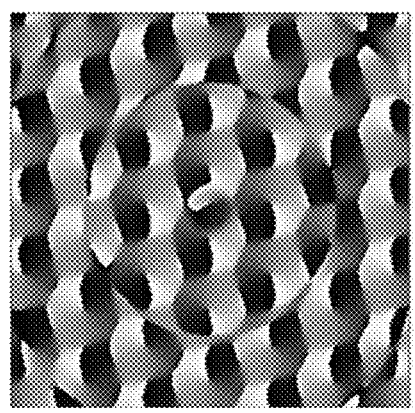

FIG. 81 presents the two-dimensional phase distribution of the focused optical field in the presence of alternative wavefront distortions at the system input after modification by the first phase structure in accordance with the third embodiment of the present invention.

Figure 82:
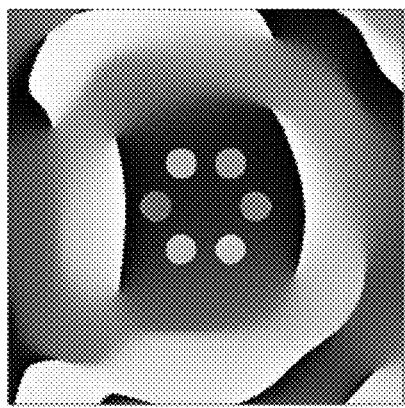

FIG. 82 presents the two-dimensional phase distribution of the modified optical field in the Fraunhofer region in the presence of wavefront distortions at the system input in accordance with the third embodiment of the present invention.

Figure 83:
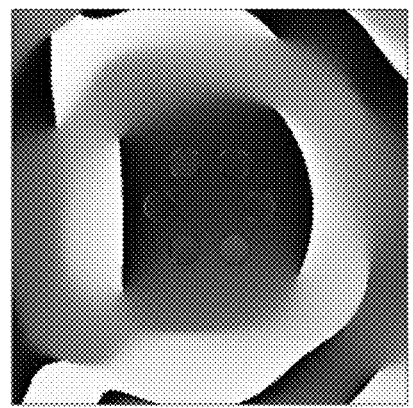

FIG. 83 presents the two-dimensional phase distribution of the modified optical field in the Fraunhofer region in the presence of wavefront distortions at the system input after additional modification with the second phase structure in accordance with the third embodiment of the present invention.

Figure 84:
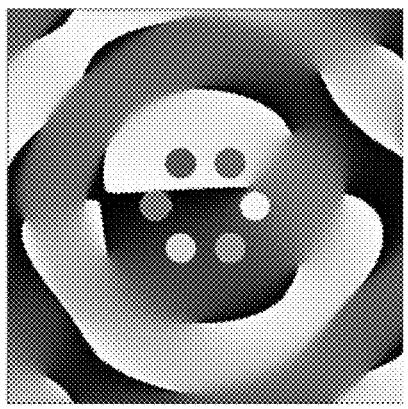

FIG. 84 presents the two-dimensional phase distribution of the modified optical field in the Fraunhofer region in the presence of alternative wavefront distortions at the system input in accordance with the third embodiment of the present invention.

Figure 85:
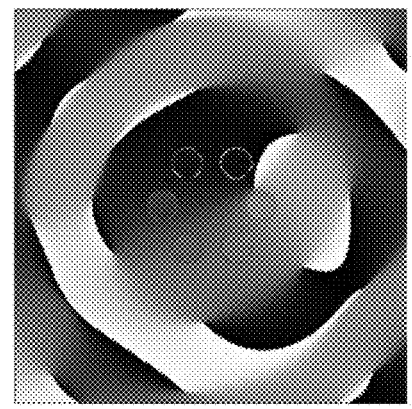

FIG. 85 presents the two-dimensional phase distribution of the modified optical field in the Fraunhofer region in the presence of alternative wavefront distortions at the system input after additional modification with the second phase structure in accordance with the third embodiment of the present invention.

Figure 86:
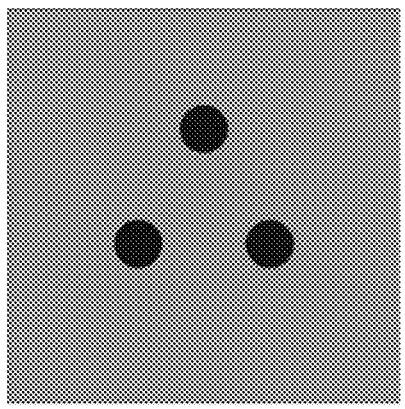

FIG. 86 presents the phase pattern of the first phase structure in accordance with the third embodiment of the present invention.

Figure 87:
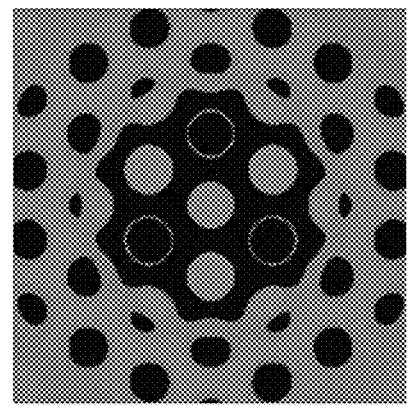

FIG. 87 presents the two-dimensional phase distributions of the focused optical field after modification by the first phase structure in accordance with the third embodiment of the present invention.

Figure 88:
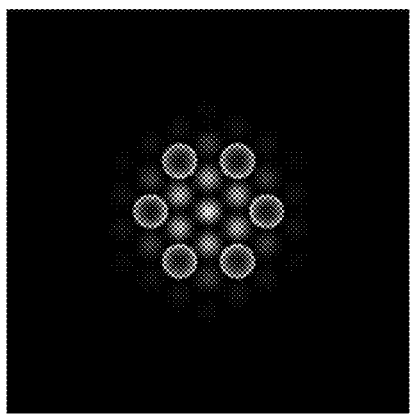

FIG. 88 presents the two-dimensional intensity distribution of the optical field in the Fraunhofer region modified by the first phase structure in accordance with the third embodiment of the present invention.

Figure 89:
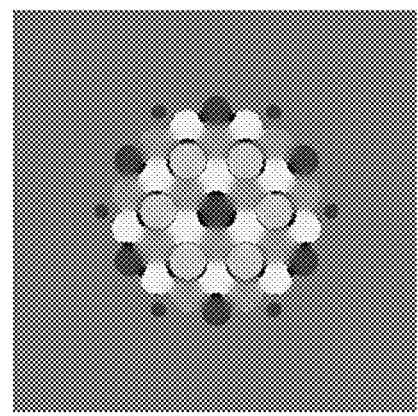

FIG. 89 presents the two-dimensional phase distribution of the optical field in the Fraunhofer region modified by the first phase structure in accordance with the third embodiment of the present invention.

Figure 90:
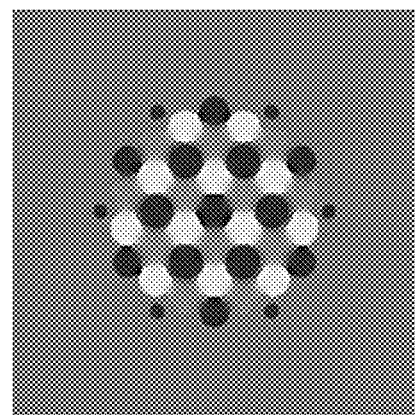

FIG. 90 presents the phase distribution of the optical field in the Fraunhofer region after additional modification by the second phase structure in accordance with the third embodiment of the present invention.

Figure 91:
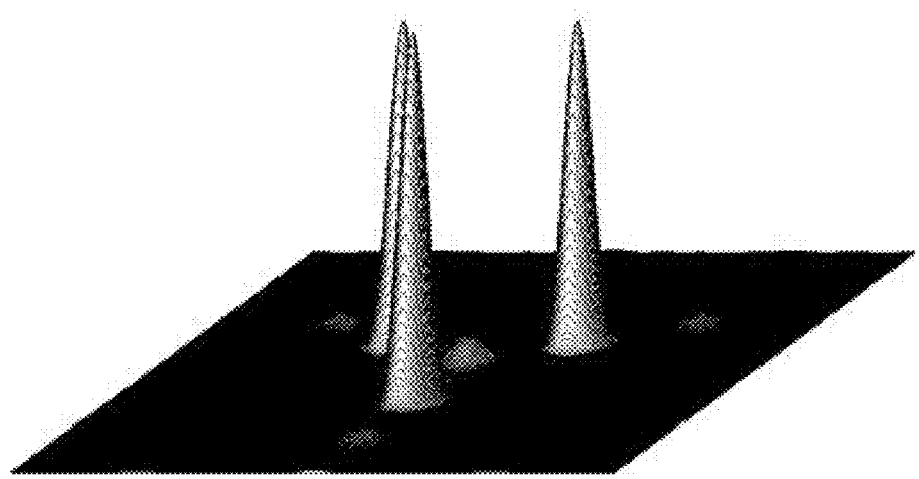

FIG. 91 presents the three-dimensional intensity distributions of the transformed optical field in accordance with the third embodiment of the present invention.

Figure 92:
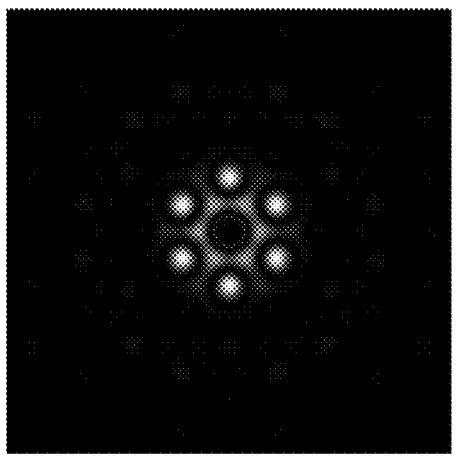

FIG. 92 presents the two-dimensional intensity distribution of the focused optical field after obstruction by the first amplitude structure in accordance with the third embodiment of the present invention.

Figure 93:
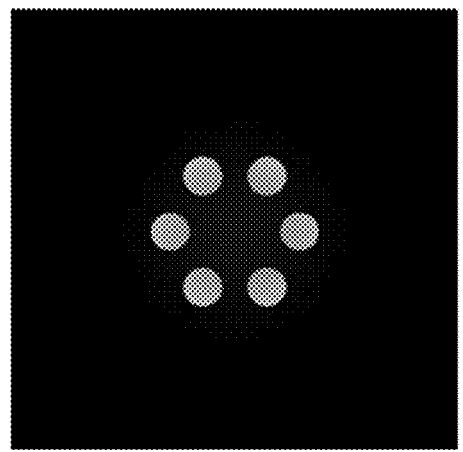

FIG. 93 presents the two-dimensional intensity distribution of the modified optical field in the Fraunhofer region after obstruction by the first amplitude structure in accordance with the third embodiment of the present invention.

Figure 94:
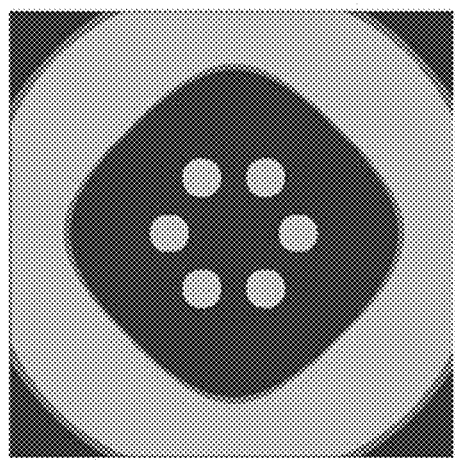

FIG. 94 presents the two-dimensional phase distribution of the modified optical field in the Fraunhofer region after obstruction by the first amplitude structure in accordance with the third embodiment of the present invention.

Figure 95:
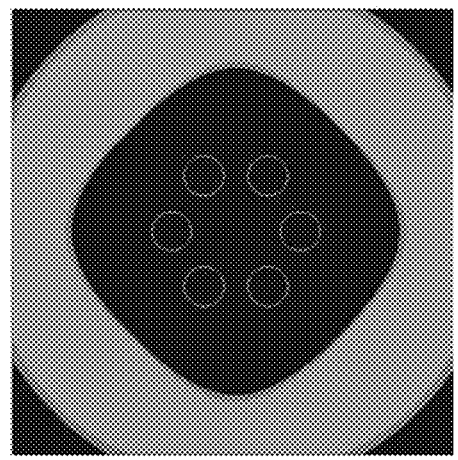

FIG. 95 presents the two-dimensional phase distribution of the modified optical field in the Fraunhofer region after additional modifications by the second phase structure in accordance with the third embodiment of the present invention.

Figure 96:
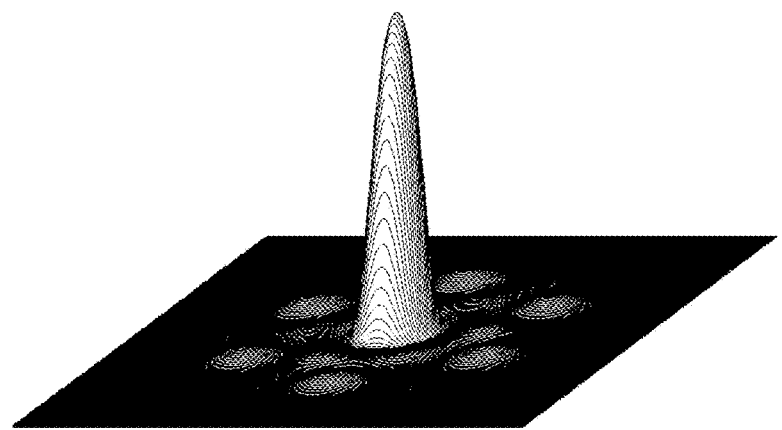

FIG. 96 presents the three-dimensional intensity distribution of the transformed optical field in accordance with the third embodiment of the present invention.

Figure 97:
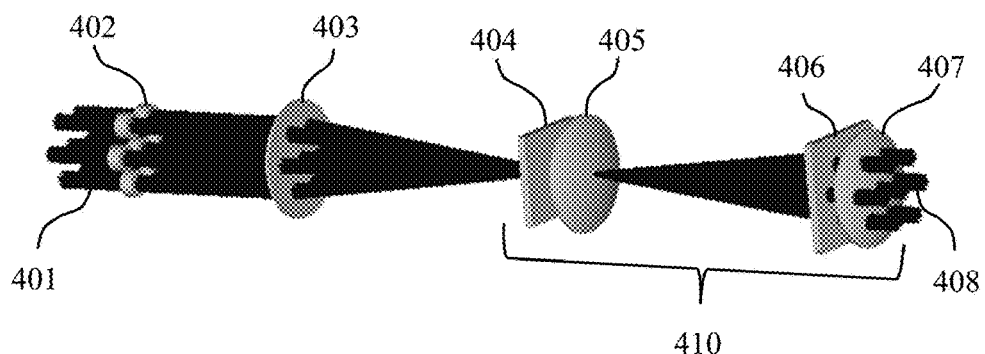

FIG. 97 presents the optical layout of the fourth embodiment of the present invention.

Figure 98:
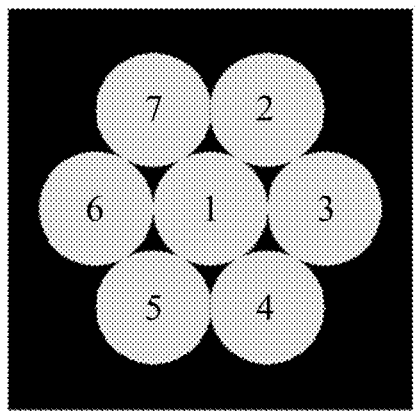

FIG. 98 presents the two-dimensional array of phase shifting elements located at the input of the optical system in accordance with the fourth embodiment of the present invention.

Figure 99:
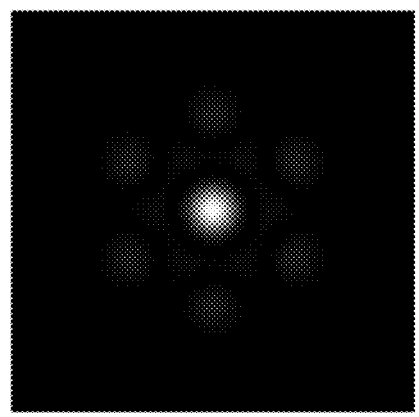

FIG. 99 presents the two-dimensional irradiance distribution of the focused optical field in accordance with the fourth embodiment of the present invention.

Figure 100:
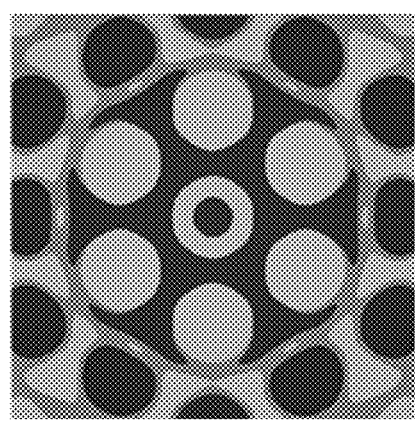

FIG. 100 presents the two-dimensional phase distribution of the focused optical field after modification by the first phase structure in accordance with the fourth embodiment of the present invention.

Figure 101:
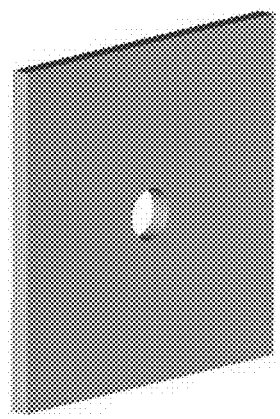

FIG. 101 presents the first phase structure located within the focused optical field in accordance with the fourth embodiment of the present invention.

Figure 102:
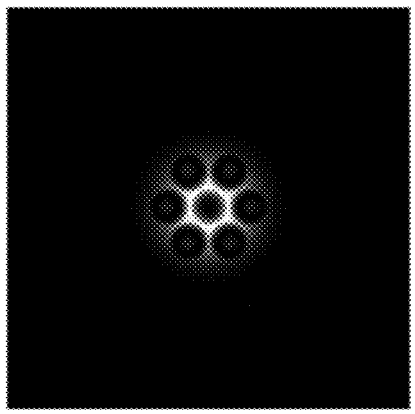

FIG. 102 presents the two-dimensional intensity distribution of the modified optical field in the Fraunhofer region in accordance with the fourth embodiment of the present invention.

Figure 103:
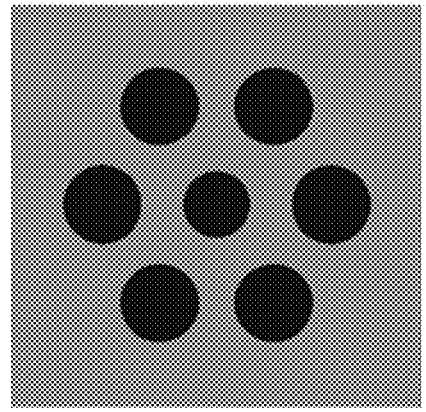

FIG. 103 presents the two-dimensional phase pattern of the second phase structure in accordance with the fourth embodiment of the present invention.

Figure 104:
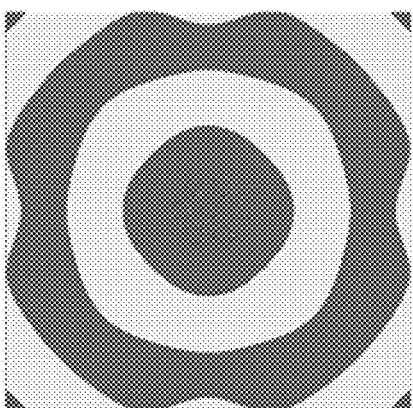

FIG. 104 presents the two-dimensional phase distribution of the modified optical field in the Fraunhofer region after additional modifications by the second phase structure in accordance with the fourth embodiment of the present invention.

Figure 105:
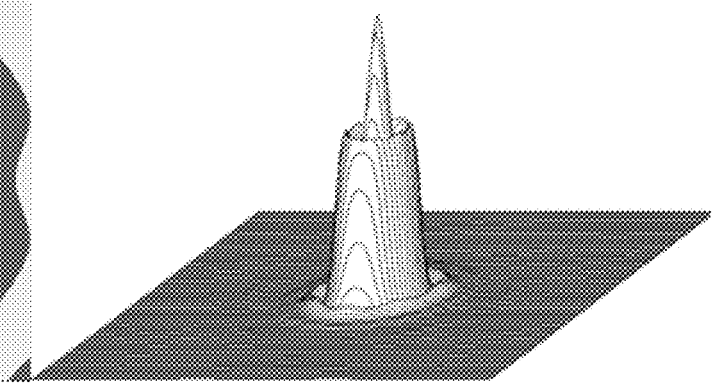
Figure 106:
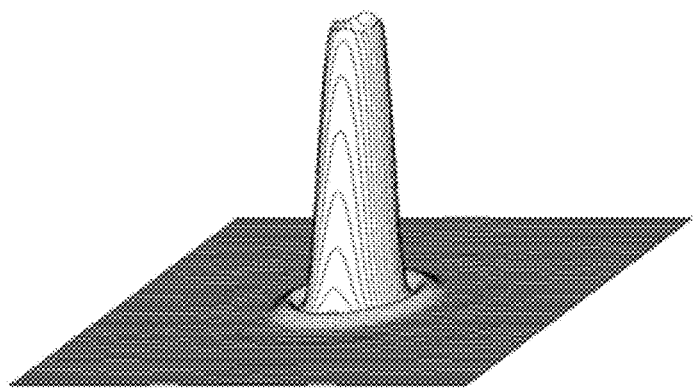

FIGS. 105 and 106 present the three-dimensional irradiance distributions of the transformed optical field in accordance with the fourth embodiment of the present invention.

Figure 107:
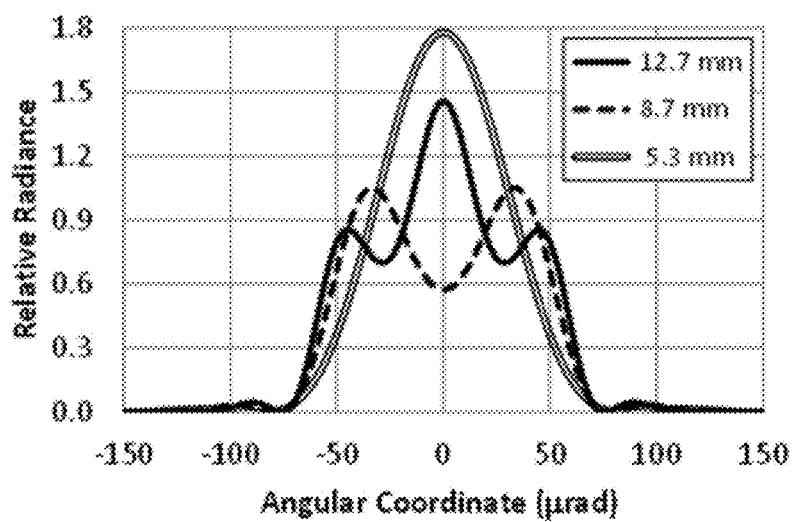

FIG. 107 presents the relative irradiance cross-sections of the transformed output field for three aperture radii values of the output lens in accordance with the fourth embodiment of the present invention.

Figure 108:
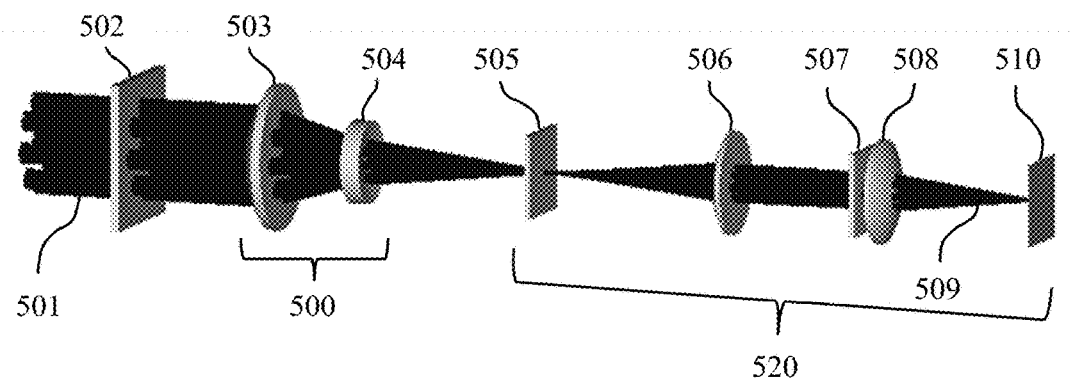

FIG. 108 presents the optical layout of the fifth embodiment of the present invention.

Figure 109:
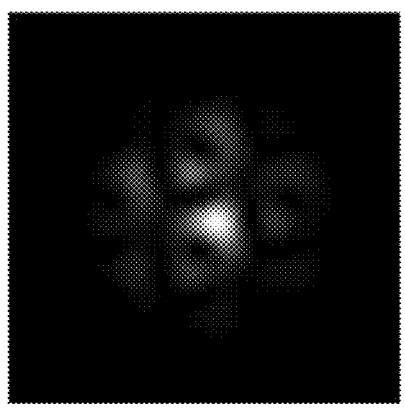

FIG. 109 presents the two-dimensional irradiance distribution of the focused OPA field in the presence of wavefront distortions in accordance with the fifth embodiment of the present invention.

Figure 110:
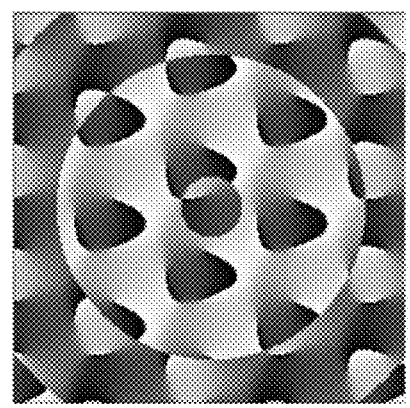

FIG. 110 presents the two-dimensional phase distribution of the focused OPA field in the presence of wavefront distortions after modification by the first phase structure in accordance with the fifth embodiment of the present invention.

Figure 111:
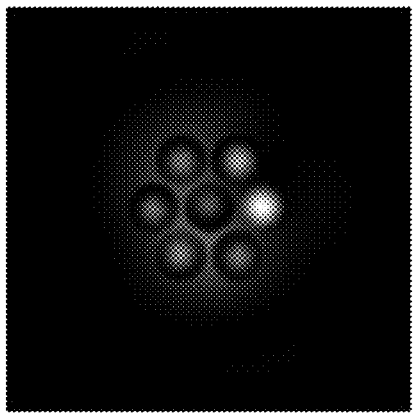

FIG. 111 presents the two-dimensional irradiance distribution of the modified optical field in the Fraunhofer region in accordance with the fifth embodiment of the present invention.

Figure 112:
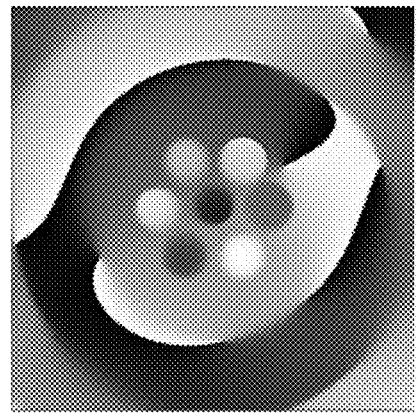

FIG. 112 presents the two-dimensional phase distribution of the modified optical field in the Fraunhofer region in accordance with the fifth embodiment of the present invention.

Figure 113:
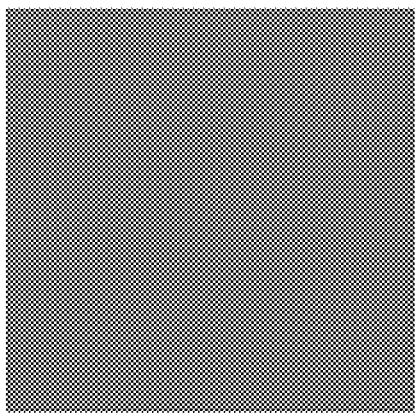

FIG. 113 presents the two-dimensional phase distribution of the modified optical field in the Fraunhofer region after additional phase modifications by the second phase structure in accordance with the fifth embodiment of the present invention.

Figure 114:
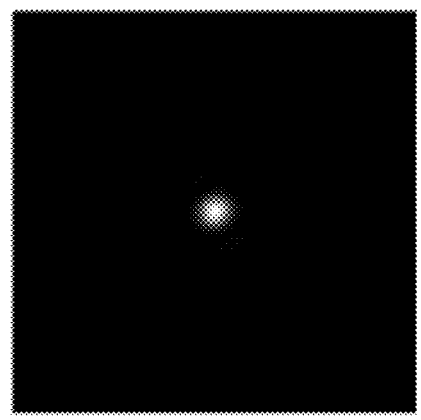

FIG. 114 presents the two-dimensional irradiance distribution of the transformed output optical field in accordance with the fifth embodiment of the present invention.

Figure 115:
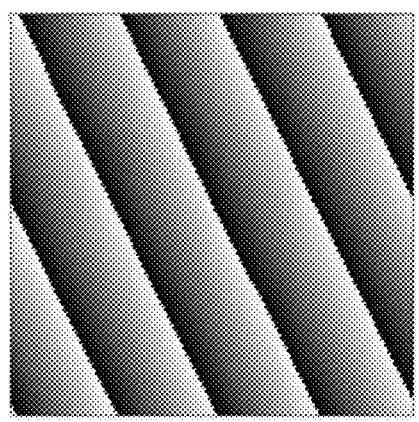

FIG. 115 presents the two-dimensional phase distribution of the modified optical field in the Fraunhofer region after additional phase modifications by the second phase structure in accordance with the fifth embodiment of the present invention.

Figure 116:
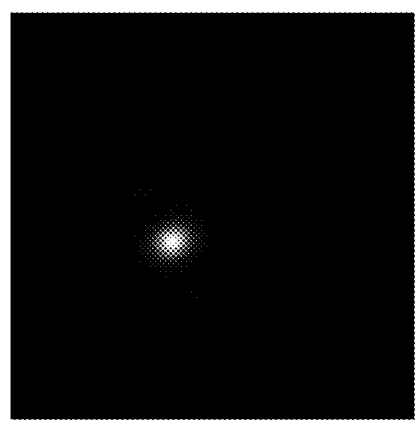

FIG. 116 presents the two-dimensional irradiance distribution of the transformed output optical field in accordance with the fifth embodiment of the present invention.

Figure 117:
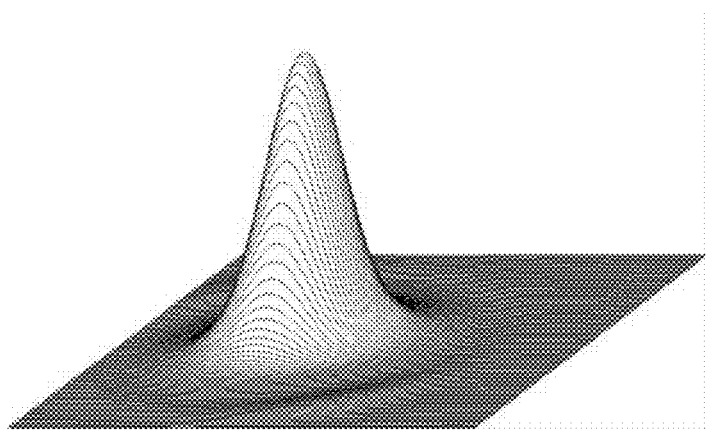

FIG. 117 presents the three-dimensional intensity distribution of the transformed output field in accordance with the fifth embodiment of the present invention.

V. DETAILED DESCRIPTION

The present invention is further described in detail in the form of specific embodiments. However, the present invention is not limited to only the specific embodiments described herein, and can be employed in a broad range of various alterations of the disclosed embodiments.

While radiation with wavelengths of 0.55 micrometers and 1.0 micrometers were employed in the following embodiments to illustrate the operational principals of the present invention, it should be clear for those skilled in the art that the teachings of this invention can be applied to optical systems operating within other regions of electromagnetic spectra, including the extreme ultraviolet, ultraviolet, visible, infrared, and terahertz radiation regions.

The present invention discloses the implementation details of coherent optical field transformation techniques, and the associated optical systems based on a combination of several optical elements to produce controlled coherent interactions within the output optical field. The technique can be applied to modify various incoming optical fields, including PSFs of optical systems, as well as the field distributions from lasers and coherent laser arrays. In accordance with the present invention, the incoming optical field is first transformed into a far field distribution by an optical system. In the case of the PSF transformations this step is not required. The transformed field distribution can be produced in the form of irradiance distribution at a finite distance from an optical system performing the field transformation. Alternatively, the transformed field can be produced in the form of a radiance distribution in the far field from the aperture of the optical system transforming the field.

The transforming optical system contains a diffractive structure placed within the coherent optical field to produce localized phase or amplitude discontinuities to the field. The field discontinuities effectively split the optical radiation into two fractions. The first fraction is caused by diffraction of the field on the localized discontinuities of the diffractive structure. The second fraction of the field bypasses the localized discontinuities of the diffractive structure, and therefore is not affected by diffraction. The transforming optical system also contains a lens with positive optical power that produces Fraunhofer diffraction region of the propagating field. The transforming optical system also contains a phase structure placed in the Fraunhofer diffraction region that produces optical path modifications to localized regions of the optical field. The transformed optical field is formed in the far field with respect to the phase structure located in the Fraunhofer diffraction region. Alternatively, the transforming optical system may contain a lens with positive optical power that follows the phase structure and produces the transformed optical field in its back focal plane. The coherent interactions within the far field are achieved by the relative adjustments in the fractional field powers, as well as the adjustments in OPD between the diffracted and non-diffracted fractions of the field. Both transmissive and reflective optical components and phase structures may be employed to modify the optical field in accordance with the present invention. In some applications, an additional phase structure can be employed as part of the transforming optical system to reduce wavefront distortions within the optical fields. By appropriately selecting properties of the optical components within the transforming optical system, as well as their relative size and placement within the system, significant flexibility in controlling the shape of the transformed output field is achieved.

The present invention can be applied to transform PSFs produced by optical systems, such as objective lenses, telescopes, concave mirrors, etc. The invention can also be applied to transform coherent optical fields, such as the fields produced by laser emitters and their combinations, into OPAs.

Transformations of the optical fields in accordance with the present invention are performed in several steps. During the first step, far field distributions of the incoming radiation are formed at, or in the vicinity of, a focal plane of an optical system.

During the second step, the far field distributions are modified by a diffractive structure placed within the formed far field. The diffractive structure contains phase or amplitude patterns that diffract fractions of the optical field.

During the third step, the optical field diffracted by the structure is transformed by an optical system into a Fraunhofer diffraction pattern. This transformation can be achieved by moving away from the optical field to satisfy the far field criterion. Alternatively, optical components with positive power can be employed to perform the transformation. The location of the Fraunhofer region within the optical system depends on the optical power of the components and their placement with respect to the optical field, as will be described in more detail in the following embodiments. Diffraction of the field by the diffractive structure results in non-uniform intensity and phase distributions within the Fraunhofer diffraction region.

During the fourth step, controlled optical path modifications are produced within localized areas of the field in the Fraunhofer diffraction region that result in coherent interactions between the fractions of the radiation at the system output. The controlled optical path modifications are produced by a phase structure placed within the optical field in the Fraunhofer diffraction region. The phase structure may also locally control the amplitude of the optical field.

During the fifth step, the optical field modified by the phase structure is transferred from the Fraunhofer diffraction region to the far field conjugate location, where coherent interactions between the different fractions of the optical field are produced. This transfer is achieved by propagating the modified optical field to the back focal plane of a lens with positive optical power, or by propagating the modified optical field over a significant distance from the system aperture to satisfy the far field condition, as will be described in more detail in the following embodiments.

Combinations of the OPDs produced by the first and second structures, as well as the localized size and shape of their respective patterns, offer a significant flexibility in transforming the optical fields and result in a variety of transformed output fields with different shapes and sizes.

Additional modifications to the transformed field can be produced by adjusting the lateral size of the field within the Fraunhofer diffraction region with changes to the f-number or aperture size within the transforming optical system. The f-number can be adjusted by changing the optical power of components within the system, or by changing the aperture size of the optical components within the system.

In accordance with the present invention, the relative size and shape of the diffractive structure pattern is selected to modify the size and shape of the transformed output field and to redistribute the fractional field power within the transformed output field. For example, the relative size and shape of the phase pattern of the diffractive structure can be employed to adjust the size and shape of the transformed field.

Figure 16:
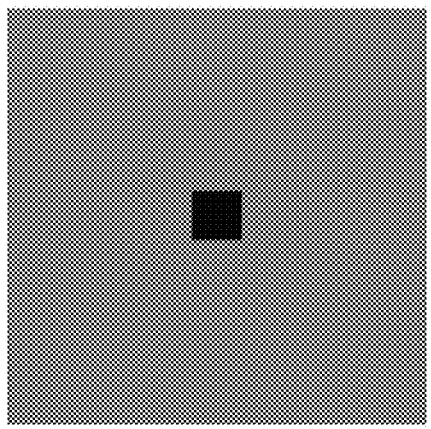
Figure 17:
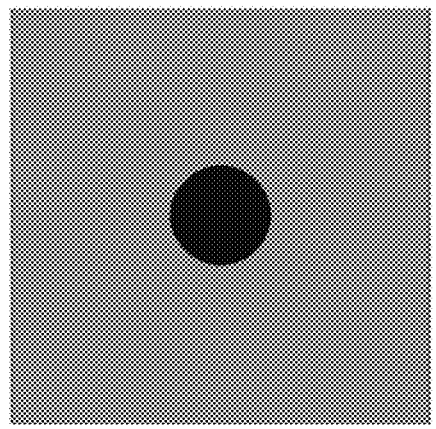
Figure 18:
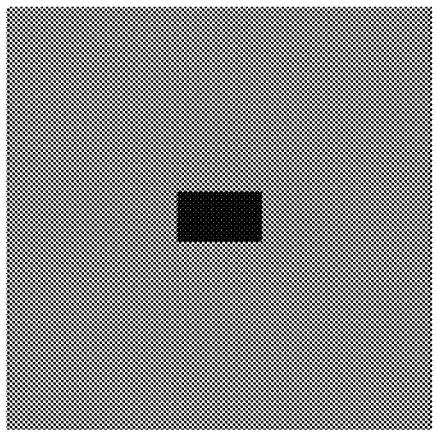
Figure 22:
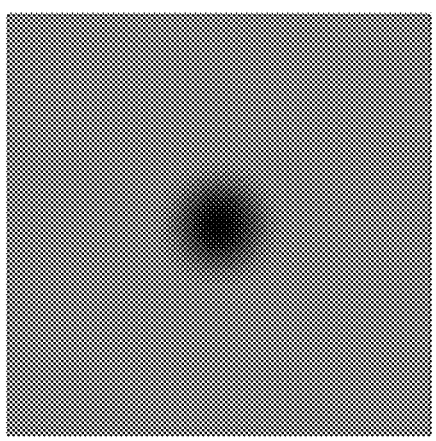
Figure 23:
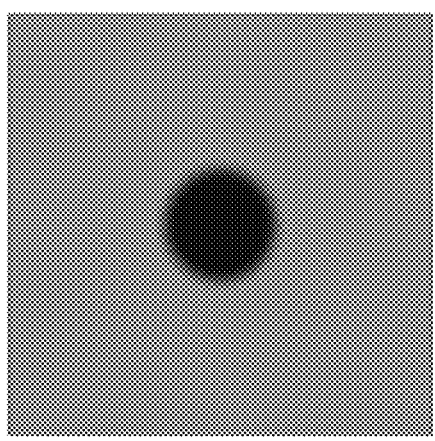

FIGS. 16 through 23 show examples of the phase pattern contained in the diffractive structure. The phase patterns constitute localized phase steps that introduce OPDs to the wavefront of the propagating radiation, and are shown in FIGS. 16 through 23 with a darker color. In the simplest case, the phase steps of the first phase structure may be square or circular in shape, as shown in FIGS. 16 and 17, respectively. The phase steps may also take a variety of alternative shapes and sizes, including a rectangular-shaped pattern shown in FIG. 18, a doughnut-shaped pattern shown in FIG. 19, multiple phase steps shown in FIG. 20, and a hollow rectangular-shaped pattern shown in FIG. 21. The phase steps may also have a variety of gradual phase transitions, as shown in FIG. 22 for a Gaussian-shaped phase step, and in FIG. 23 for a circular phase step having an apodized edge with gradually changing phase. More complex patterns of the first phase structure can be produced, for example, as various combinations of the phase primitives shown in FIGS. 16 through 23.

In the absence of wavefront distortions of the focused optical field, efficient field transformation can be achieved when the OPDs produced by the first phase structures are the product of an odd integer j and half of the radiation wavelength $0.5\lambda$, as defined by equation (2). In some applications, the lowest value of $OPD=0.5\lambda$, corresponding to the lowest odd integer $j=1$, is employed. In the presence of wavefront distortions, or when the local shape of the transformed field needs to be altered, the OPDs produced by the phase patterns may no longer be equal to the values defined by the equation (2), as will be further shown in the following embodiments.

The disclosed technique for the coherent transformation of optical field distributions may also include a means for adjusting the size and shape of the resulting output fields. In accordance with the present invention, adjustments in the lateral size and shape of the transformed fields are performed using electronically controlled devices such as spatial light modulators (SLMs). SLMs may be employed to dynamically adjust the lateral size and shape of the phase structures, therefore altering the resulting size and shape of the transformed output fields. Examples of SLMs suitable for controlling the transformed field distributions in accordance with the present invention may include, but are not limited to: liquid crystal on silicone (LCOS) SLMs manufactured by Boulder Nonlinear Systems, translucent Liquid Crystal Display (LCD) and reflective (LCOS) SLMs manufactured by HOLOEYE Photonics AG, and Digital Micromirror Devices (DMDs) manufactured by Texas Instruments, Inc.

The peak value, shape, and size of the transformed field distributions in accordance with the present invention are defined by the specific properties and location of the optical components comprising the optical system that transforms the optical field. Details of the disclosed techniques for transforming focused field distributions, as well as the optical devices for their implementation, will be explained in detail in the following embodiments.

First Embodiment:

The first embodiment of the present invention is designed to transform PSF distributions of diffraction-limited optical systems with uniformly illuminated circular apertures, also known as Airy distributions. FIG. 24 shows the optical layout corresponding to the first embodiment of the present invention. It shows a diffraction-limited optical system 101 producing an Airy distribution in its back focal plane, as well as an optical system 102 for transforming the Airy distribution. The input intensity distribution and the Airy intensity distribution in the focal plane of a diffraction-limited optical system were shown earlier in FIGS. 5 and 6, respectively.

The optical system 102 in accordance with the first embodiment of the present invention transforms the PSF distribution of the diffraction-limited optical system 101 and produces the transformed optical field in the output plane 108. The optical system 102 contains a diffractive structure 103 placed within the focused optical field in the back focal plane of the optical system 101, a lens 104 with positive optical power located in proximity to the first diffractive structure 103, a lens 105 with positive optical power located at the front focal distance from the lens 104, a phase structure 106 located after the lens 105, and a lens 107 with positive optical power located after the phase structure 106. To reduce the axial distance of the optical layout, the optical components 105, 106, and 107 are placed in proximity to each other. The output plane 108 is located in the back focal plane of the lens 107.

An optional phase structure, not shown in FIG. 24, may also be inserted into the optical path of the optical system 101 to compensate for wavefront distortions of the incoming optical field. When the incoming optical field is not distorted, the incoming radiation propagates through the diffraction-limited optical system 101 and forms an Airy distribution at the back focal plane of the optical system 101. The structure 103 is placed at the back focal plane of the optical system 101 and diffracts a fraction of the focused Airy distribution by introducing localized OPDs to the focused optical field. In accordance with the first embodiment, the diffractive structure 103 contains a phase step. The phase step size of the diffractive phase structure 103 is selected to be less than the size of the central node of the Airy distribution. The diffracted field further propagates through the lens element 104, placed in proximity to the diffractive phase structure 103, onto the lens element 105 placed in the back focal plane of the lens element 104. The focal lengths of the lens elements 104 and 105 are equal to each other. The lens element 105 collimates the field modified by the elements 103 and 104, and directs it onto the phase structure 106. The phase structure 106 is located in the back focal plane of the lens element 104, corresponding to the Fraunhofer diffraction region of the radiation diffracted by the phase structure 103.

The phase structure 106 modifies the field by producing localized OPDs within the Fraunhofer diffraction region. The size of the phase structure 106 is selected to affect only a fraction of the field in the Fraunhofer diffraction region. By adjusting the OPDs produced by the phase structure 106 within the Fraunhofer diffraction region, shape modifications of the transformed field within the output plane 108 are produced.

The field modified by the phase structure 106 propagates through the focusing lens 107, and forms the transformed PSF distribution in the output plane 108. The axial distance between the optical components 106 and 107 can be adjusted based on the packaging requirements of the system. The output plane 108 is located in the back focal plane of the lens 107. The axial location of the observation plane 108 can be modified by changing the focal length of the lens element 107. The lateral size of the transformed field produced in the output plane 108 is proportional to the magnification of the optical system 102 and the size of the phase pattern of the diffractive structure 103. Therefore, the lateral size of the transformed field in the output plane 108 can be adjusted by changing the focal lengths of the lenses 104, 105, and 107 or the phase pattern size of the diffractive structure 103. The focal lengths of the lens elements 104, 105, and 107, in accordance with the first embodiment of the present invention, are equal, and therefore the optical system 102 has a magnification of $M=-1$. When the structures 103 and 106 are absent from the system 102, the system will produce in the output plane 108 an image conjugate of the PSF from the diffraction-limited optical system 101.

Although the diffractive structure 103 and the lens 104 with positive optical power are shown in FIG. 24 as two optical elements located in proximity to each other, they can be combined into a single optical element that performs both functions of the two elements. In that case, one of the element's surfaces will contain the features of the diffractive phase structure 103, while the other surface of the element will produce the optical power of the lens 104. In a similar way, the second phase structure 106 can be combined with either of the lenses 105 or 107 to form a single optical element. One of the element's surfaces will contain the phase structure, while the other surface of the element will produce the optical power of the respective lens.

The lens elements 105 and 107 can also be combined into a single lens with optical power equal to the sum of the optical powers of the lenses 105 and 107. In the most general case, the phase structure 106 and the lens elements 105 and 107 can be combined into a single optical element that performs the functions of the phase structure and the lens elements. The phase profile of the phase structure 106 can be fabricated on one of the element surfaces, or embedded into the element.

In accordance with the first embodiment of the present invention, the optical system 101 has an aperture diameter of $d_{101}=8$ mm and a focal length of $f_{101}=500$ mm. The wavelength of the propagating radiation is 1 micron, which, in accordance with equation (1), results in an Airy disk diameter of 0.1525 mm.

The diffractive structure 103 and the phase structure 106 contain circular-shaped phase steps, similar to the phase step shown in FIG. 17. The phase steps of the structures 103 and 106 are centered with respect to the propagating field and introduce an optical path difference $OPD=j0.5\lambda$ in accordance with equation (2) to the localized fractions of the propagating radiation, where j is an odd integer. When the phase structures 103 and 106 are fabricated as phase relief profiles onto the respective substrates, the height of the phase steps h is calculated as:

$$h = \frac{OPD}{(n-1)} \quad (3)$$

where n is the refractive index of the phase structure substrate material. For the phase structures 103 and 106 substrates made of BK7 glass with a refractive index $n=1.5075$ corresponding to a wavelength $\lambda=1$ micron of the propagating radiation and $j=1$, the step height h of the phase structures corresponding to $OPD=0.5\lambda$ is equal to 0.9852 microns.

The focal lengths of the lenses 104, 105, and 107 are $f_{104}=f_{105}=f_{107}=100$ mm, and the axial distances between the phase structures 103 and 106, as well as between the phase structure 106 and the output plane 108, are also equal to 100 mm.

The diffractive structure 103 contains a single phase step with the radius $r_1$. The phase structure 106 also contains a single phase step with the radius $r_2=0.8$ mm defined by the following equation:

$$r_2=(d_{101}f_{104})/(2f_{101}) \quad (4)$$

For a given phase step radius $r_2$ of the phase structure 106, the shape of the modified field distribution produced at the output plane 108 depends on the phase step radius $r_1$ of the diffractive structure 103. The relative radiation power contained within the central node of the modified field distribution at the output plane 108 also depends on the phase step radial size $r_1$ of the diffractive structure 103, and is shown in FIG. 25. The radial size $r_3$ of the central node of the modified field distribution at the output plane 108 in accordance with the first embodiment of the present invention is equal to the radial phase step size $r_1$ of the diffractive structure $r_3=r_1$.

The shape of the modified field distribution produced at the output plane 108 also depends on the f-number of the system defined by the smallest aperture size of the two lenses 105 and 107. When the apertures of the lenses 105 and 107 are large, corresponding to small f-numbers, diffraction effects and field truncations on the lens apertures do not alter the shape of the transformed field within the output plane 108. With a reduction in the lens aperture sizes and the respective increase in the f-number of the optical system 102, diffraction effects start playing an important role in shaping the transformed field in the output plane 108.

When the phase step radius $r_1$ of the diffractive structure 103 is adjusted to $r_1=22$ microns, the transformed field distribution in the output plane 108 will contain the maximum power of the propagating radiation within the central node, as shown in FIG. 25. FIG. 26 presents a two-dimensional intensity distribution of the focused optical field produced by the optical system 101 in the back focal plane in accordance with the first embodiment of the present invention. FIG. 27 presents a two-dimensional phase distribution of the focused optical field in the back focal plane of the optical system 101 after modification by the diffractive phase structure 103 containing a circular phase step with radius of $r_1=22$ microns.

FIGS. 28 and 29 present the respective two-dimensional intensity and phase distributions of the modified optical field in the Fraunhofer diffraction region after the lens element 105 and prior to entering the phase structure 106. The two-dimensional field distributions in the Fraunhofer diffraction region are non-uniform with respect to both intensity and phase. FIG. 30 presents the two-dimensional phase distribution of the modified optical field in the Fraunhofer region after modification produced by the second phase structure 106. FIG. 30 shows the addition of an OPD by the circular phase step of the phase structure 106 with a radial size of $r_2$=0.8 mm. The OPD produced by the phase structure 106 enhances the fractional power contained in the central node of the transformed field in the output plane by reducing the phase discontinuities between the phase step and the phase region surrounding the step, as shown in FIG. 30. FIGS. 31 and 32 present the three-dimensional intensity distributions of the transformed optical fields at the output plane 108 corresponding to the respective radial sizes of the lens 107 aperture of 100 mm and 10 mm. FIG. 33 presents the axial cross-sections of the relative intensity distributions of the transformed optical fields at the output plane 108 for three different aperture radii of the output lens 107. The three output field distributions shown in FIG. 33 correspond to the radial aperture sizes of 100 mm, 15.5 mm, and 3.9 mm, and contain within the 22 microns central peak radius of the transformed output field 99.4%, 95.8%, and 82.3% of the propagating radiation power, respectively.

Adjustments to the radius $r_1$ of the diffractive phase structure 103 alter the fractional power contained within the central node of the transformed field, as shown in FIG. 25. When the radius $r_1$ of the diffractive phase structure 103 is adjusted to $r_1$=48 microns, the transformed field in the output plane 108 will contain a minimum radiation power in the center. FIGS. 34 through 39 present field distributions of the first embodiment, when the radius $r_1$ of the phase structure 103 was adjusted to $r_1$=48 microns. FIG. 34 presents the two-dimensional phase distribution of the optical field in the back focal plane of the optical system 101 after modification by the diffractive structure 103. The phase distribution in FIG. 34 contains the OPD produced by the circular phase step of the diffractive structure 103 with the radius of $r_1$=48 microns. FIGS. 35 and 36 present the respective two-dimensional intensity and phase distributions of the diffracted optical field in the Fraunhofer region prior to the phase structure 106. FIGS. 35 and 36 reflect the fact that the optical field in the Fraunhofer diffraction region is non-uniform with respect to both intensity and phase. FIG. 37 presents the two-dimensional phase distribution of the optical field in the Fraunhofer diffraction region after the OPD produced by the phase structure 106. It contains OPD produced by the circular phase step of the phase structure 106 with a radial size of $r_2$=0.8 mm. The OPD produced by the phase structure 106 results in increased phase discontinuities within the Fraunhofer diffraction field, as shown in FIG. 37. FIG. 38 presents the two-dimensional intensity distribution of the transformed optical field in the output plane 108 corresponding to a 50 mm radial size of the lens 107 aperture. FIG. 39 presents the axial cross-sections of the relative intensity distributions of the transformed optical fields in the output plane 108 with suppressed central node peaks for three different radial apertures of the lens 107. The axial cross-sections shown in FIG. 39 correspond to the lens 107 radial aperture values of 50 mm, 5.5 mm, and 2.0 mm and contain within the axial region with a radial size of 48 microns 0.1%, 4.1%, and 7.5% of the transformed output field power, respectively.

Second Embodiment:

The second embodiment of the present invention is designed to transform PSF distributions of optical systems with central obscurations. This type of optical system is commonly found in reflective astronomical telescopes. The optical layout of the second embodiment of the present invention is presented in FIG. 40. It shows the optical system 200 with central obscuration producing a PSF distribution in the back focal plane, as well as the optical system 203 for transforming the PSF of the optical system 200 and producing the transformed optical field distribution in the output plane 206. The optical system 200 consists of a primary mirror 201 with a central opening and a secondary mirror 202 obstructing the aperture of the primary mirror 201. The uniformly illuminated aperture and the PSF intensity distribution of an optical system with central obscuration were shown in FIGS. 7 and 8, respectively.

In accordance with the second embodiment, the primary mirror 201 of the optical system 200 has an aperture diameter $d_{201}$=8 mm, and the secondary mirror 202 of the optical system 200 obscures the aperture of the primary mirror 201 and has a diameter $d_{202}$=5 mm. The effective focal length $f_{200}$ of the optical system 200 with central obscuration is $f_{200}$=500 mm. When the wavelength of the radiation is 1 micron, the PSF central core diameter produced by the optical system 200 in the back focal plane is approximately 116 microns.

The optical system 203 in accordance with the second embodiment of the present invention contains two optical elements 204 and 205 with positive optical power, and produces the transformed field distributions in the output plane 206. The optical element 204 is placed at the back focal plane of the optical system 200, and the element 205 is located in the back focal plane of the element 204. The modified field distributions are produced in the output plane 206 located after the element 205 at the image conjugate location with respect to the back focal plane of the optical system 200. The axial distance $L_1$ between the back focal plane of the optical system 200 and the element 205 is often selected to be equal to the focal length $f_{204}$ of the lens element 204, i.e. $L_1$=$f_{204}$. The distance $L_2$ between the optical element 205 and the output plane 206 is a function of the focal lengths $f_{204}$ and $f_{205}$ of the respective optical elements 204 and 205 contained within the optical system 203, and is defined as:

$$L_2 = \frac{f_{204} f_{205}}{f_{204} - f_{205}} \quad (5)$$

When the focal length of the element 204 is twice the focal length of the element 205, i.e. when $f_{204}$=$2f_{205}$, the two axial distances $L_1$ and $L_1$ are equal to each other $L_1$=$L_2$=$2f_{205}$. It should be noted that in accordance with the second embodiment, the focal length $f_{205}$ of the element 205 cannot exceed the focal length $f_{204}$ of the element 204.

The element 204 of the optical system 203 contains a diffractive phase structure 207 fabricated on one of the element's surfaces. While the shape of the lens surface containing the phase structure 207 can be convex, planar, or concave, in accordance with the second embodiment, the surface containing the phase structure 207 was selected to be planar. The surface 208 is convex-shaped to produce positive optical power to the element 204. The element 205 of the optical system 203 contains a second phase structure 209 fabricated on one of the element's surfaces. The shape of the element's surface containing the phase structure 209 can be convex, planar, or concave, and was selected to be planar in accordance with the second embodiment. The lens surface 210 is convex-shaped to produce positive optical power to the element. The fractional radiation power contained within the central node of the transformed field in the output plane 206 depends on the lateral size and shape of the phase steps of the phase structures 207 and 209. An optional third phase structure, not shown in FIG. 40, can be inserted into the optical path prior to the optical system 200, or after the first element 204, to compensate for wavefront distortions in the optical field.

The incoming radiation propagates through the diffraction-limited optical system 200 with central obscuration and forms a PSF field distribution at the output of said optical system 200. When the object is located at infinity, the PSF is formed in the back focal plane of the optical system 200. The optical system 203 transforms the PSF and produces the transformed optical field at the output plane 206. The first element 204 of the optical system 203 containing the diffractive structure 207 is placed after the optical system 200 so that the diffractive structure 207 is co-located with the PSF distribution of the optical system 200. The structure 207 diffracts a fraction of the PSF field by introducing localized phase discontinuities to the optical field.

Both diffracted and non-diffracted fractions of the PSF are further modified by the lens surface 208 of the lens element 204 and are directed onto the surface of the element 205 containing the phase structure 209. The phase structure 209 is positioned within the Fraunhofer diffraction pattern of the radiation diffracted by the phase structure 207. In accordance with the second embodiment, the phase structure 209 is placed in the back focal plane of the element 204. The phase structure 209 contained within the element 205 modifies the optical field within the Fraunhofer region by introducing localized OPDs to fractions of the field. The optical field is further modified by the convex surface 210 of the lens element 205, and is directed onto the output plane 206 where the transformed field distribution is produced.

The phase step of the diffractive structure 207 is square-shaped, as shown in FIG. 16, and has a lateral size of $l_1=60$ microns. The square-shaped step of the diffractive structure 207 produces an optical path difference of OPD=$0.5\lambda$ to a fraction of the optical field within the PSF. The square-shaped phase step of the first phase structure 207 is centered with respect to the PSF field in the back focal plane of the optical system 200 and is selected to be smaller than the size of the central node of the PSF. The phase step is fabricated onto the planar surface of the lens 204. When the phase structure 207 is formed as a phase relief pattern onto the surface of the lens element 204, the height of the phase mask steps h is calculated based on equation (3). For the lens 204 made of BK7 glass with a refractive index n=1.5075 at the working wavelength of $\lambda=1$ micron, the step height h of the phase structure 207 corresponding to OPD=$0.5\lambda$ is equal to 0.9852 microns.

Figure 19:
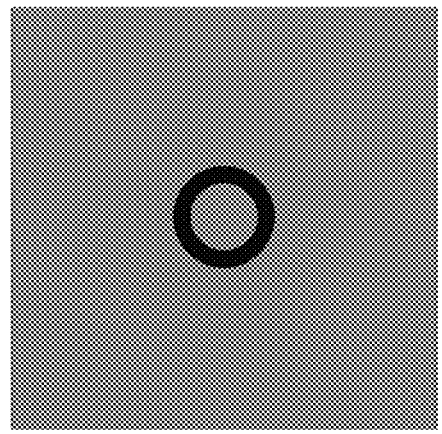
Figure 20:
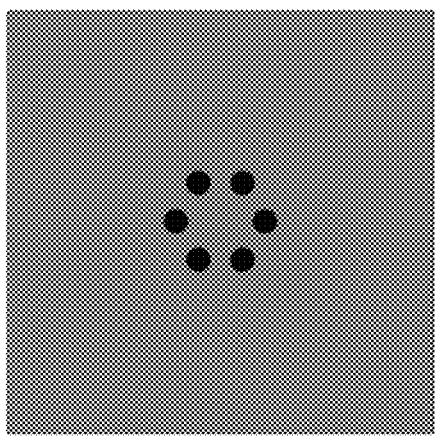
Figure 21:
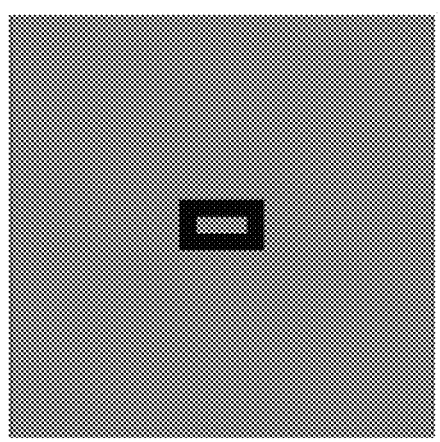

The size of the phase structure 209 is selected to alter only a fraction of the field produced within the Fraunhofer diffraction region after the element 204. By adjusting the OPD produced by the phase structure 209 within the Fraunhofer diffraction region, constructive or destructive interference between the fractions of the propagating field within the output plane 206 is produced. The phase step of the phase structure 209 is doughnut-shaped, as shown in FIG. 19. The doughnut-shaped phase step introduces a localized optical path difference of OPD=$0.5\lambda$. The doughnut-shaped phase step of the phase structure 209 is fabricated onto the planar surface of the element 205 and is centered with respect to the propagating field. The outer $r_o$ and inner $r_i$ radii of the doughnut-shaped phase step of the second phase structure 209 are found using the following equations:

$r_o=(d_{201}f_{204})/(2f_{200})$ and $r_i=(d_{202}f_{204})/(2f_{200})$. In accordance with the second embodiment, the focal length of the element 204 is $f_{204}=100$ mm and the focal length of the lens 205 is $f_{205}=50$ mm. The axial distances between the elements 204 and 205, and between the element 205 and the output plane 206, are both equal to 100 mm.

The outer and inner radii of the doughnut-shaped phase step of the phase structure 209 are calculated to be $r_o=0.8$ mm and $r_i=0.5$ mm, respectively. When the phase structure 209 is fabricated as a phase relief pattern onto the surface of the lens element 205, the height of the phase mask steps h is calculated based on equation (3). For the lens 205 made of BK7 glass with a refractive index n=1.5075 at the working wavelength of $\lambda=1$ micron, the step height h of the phase structure 209 corresponding to OPD=$0.5\lambda$ is equal to 0.9852 microns.

The transformed field central node lateral size $l_{tr}$ produced in the observation plane 206 is proportional to the linear size $l_1$ of the phase step of the diffractive structure 207. The lateral size of the transformed field central node intensity $l_{tr}$ also depends on the focal lengths $f_{204}$ and $f_{205}$ of the respective elements 204 and 205:

$$l_{tr} = \frac{l_1 f_{205}}{f_{204} - f_{205}} \quad (6)$$

The central node size $l_{tr}$ of the transformed field in the output plane 206 can be adjusted based on the appropriate selection of the focal lengths $f_{204}$ and $f_{205}$ of the respective elements 204 and 205 of the optical system 203. When the axial distance $L_1$ is twice the focal length of the lens element 205, i.e. $L_1=f_{204}=2f_{205}$, the central node size $l_{tr}$ of the transformed field in the output plane 206 is equal to the step size of the phase structure 207 $l_{tr}=l_1$.

FIG. 41 presents the two-dimensional intensity distribution of the PSF produced by the optical system 200. FIG. 42 presents the two-dimensional phase distribution of the field produced in the back focal plane of the optical system 200 after modification by the first phase structure 207. The phase distribution in FIG. 42 is modified by the square-shaped phase step of the phase structure 207 producing localized optical path difference of OPD=$0.5\lambda$. FIG. 43 presents the two-dimensional intensity distribution of the optical field produced in the Fraunhofer diffraction region after the element 204. FIG. 44 presents the two-dimensional phase distribution of the optical field produced in the Fraunhofer region after the element 204 and prior to modifications by the element 205 containing the second phase structure 209. FIGS. 43 and 44 indicate that both the intensity and the phase distributions of the field produced in the Fraunhofer diffraction region are non-uniform.

FIG. 45 presents the phase distribution of the optical field in the Fraunhofer region after modification by the second phase structure 209 containing a doughnut-shaped phase step. The doughnut-shaped phase step of the second phase structure 209 introduces a localized optical path difference of OPD=$0.5\lambda$. The OPD produced by the doughnut-shaped phase step of the second phase structure 209 reduces phase discontinuities within the Fraunhofer diffraction region without affecting the field amplitude, as shown in FIG. 45.

Three-dimensional intensity distributions of the transformed fields produced in the output plane 206 are shown in FIGS. 46 through 48. The field distributions correspond to the element 205 aperture radii of 20.0 mm, 5.25 mm, and 2.75 mm, respectively. FIG. 49 shows the relative intensity cross-sections of the transformed field distributions produced in the output plane 206 for the three element 205 aperture radii of 20.0 mm, 5.25 mm, and 2.75 mm. The three transformed output field distributions shown in FIGS. 46 through 48 contain respectively 99%, 94%, and 87% of the propagating radiation power within the square-shaped central node of the transformed field in the output plane 206.

Alternative shapes of the output transformed field can be achieved by changing the size and shape of the phase pattern of the first phase structure 207. For example, replacing the square-shaped phase step of the phase structure 207 with a doughnut-shaped phase step, similar to the phase step shown in FIG. 19, while retaining the shape of the second phase structure 209 will result in a transformed output field with a suppressed central core peak containing very limited optical radiation on-axis. In accordance with the second embodiment, the phase structure 207 is made in the form of a doughnut-shaped step that is centered with respect to the PSF field in the back focal plane of the optical system 200 and introduces an optical path difference of OPD=0.5λ to a fraction of the focused optical field. The doughnut-shaped phase step of the phase structure 207 is fabricated onto the planar surface of the lens 204 and has an outer radius $r_o$=60 microns and an inner radius $r_i$=18 microns. When the phase structure 207 is produced as a phase relief pattern onto the surface of the lens 204, the height of the phase mask step h is calculated based on equation (3). For the lens 204 made of BK7 glass with a refractive index n=1.5075 at the wavelength of λ=1 micron, the step height h of the phase structure 207 corresponding to OPD=0.5λ is equal to 0.9852 microns.

FIG. 50 presents the two-dimensional phase distributions of the PSF optical field after modification by the diffractive structure 207 containing the doughnut-shaped phase step. FIG. 51 presents the two-dimensional intensity distribution of the optical field in the Fraunhofer diffraction region after the first element 204 and prior to entering the phase structure 209 of the second lens 205. FIG. 52 shows the two-dimensional phase distribution of the optical field in the Fraunhofer region prior to entering the phase structure 209 of the second lens 205. The optical field in the Fraunhofer diffraction region is non-uniform with respect to intensity and phase, as shown in FIGS. 51 and 52. FIG. 53 shows the phase distribution of the optical field in the Fraunhofer diffraction region after modification by the phase structure 209 of the second lens element 205. The OPD produced by the doughnut-shaped phase step of the second phase structure 209 produces destructive interferometric interactions between the fractions of the radiation in the output plane by reducing the phase discontinuities between the phase step and the phase regions surrounding the step. FIG. 54 shows the resulting three-dimensional intensity distribution of the transformed output field produced in the output plane 206 with the second lens element 205 having an aperture radius of 4.0 mm. FIG. 55 presents the axial intensity cross-sections of the transformed field produced in the output plane 206 with the element 205 having aperture radii of 40.0 mm, 4.0 mm, and 2.4 mm. The encircled power contained within the 36 microns aperture centered with respect to the radiation pattern and corresponding to the three radii shown in FIG. 55 is 0.4%, 3.9%, and 3.6%, respectively.

A variety of complex shapes of the transformed output field can be produced by employing a diffractive structure 207 containing multiple phase regions. FIGS. 56 through 61 show the formation of a complex output field within the output plane 206 in the presence of multiple phase regions contained within the diffractive structure 207. FIG. 56 presents a phase pattern of the diffractive structure 207 composed of three phase regions. Two of the phase regions in FIG. 56 are circular-shaped apodized patterns, similar to the pattern shown in FIG. 23. The two apodized patterns have a radial size of 25 microns and a phase transition zone width of 20 microns. The optical path difference in the central regions of the apodized patterns with a radius of 5 microns is OPD=0.5λ. The optical path difference gradually decreases to OPD=0 over the transition zone width of 20 microns. The phase pattern of the first phase structure 207 shown in FIG. 17a also contains a rectangular central region with a length of 112 microns and a width of 12 microns. The rectangular central region of the phase pattern produces an optical path difference of OPD=0.3λ to the propagating field. FIG. 57 presents the two-dimensional phase distributions of the optical field after modification by the diffractive structure 207 placed into the focused field produced by the optical system 200. FIG. 57 shows that the phase pattern of the diffractive structure 207 is contained within the central node of the PSF. FIG. 58 presents the two-dimensional intensity distribution of the modified optical field in the Fraunhofer diffraction region prior to entering the planar surface of the element 205 containing the second phase structure 209. FIG. 59 shows the two-dimensional phase distributions of the modified optical field in the Fraunhofer region prior to entering the planar surface of the element 205 containing the second phase structure 209. FIGS. 58 and 59 indicate that the Fraunhofer diffraction field is non-uniform with respect to both intensity and phase. FIG. 60 presents the phase distribution of the optical field in the Fraunhofer region after modification by the second phase structure 209 containing a doughnut-shaped phase step. The doughnut-shaped step of the phase structure 209 introduces a localized optical path difference of OPD=0.25λ to the propagating radiation and is centered with respect to the propagating field. The outer and inner radii of the doughnut-shaped phase step of the second phase structure 209 are 0.8 mm and 0.5 mm, respectively. The OPD produced by the doughnut-shaped phase step of the second phase structure 209 is designed to produce controlled interferometric interactions between the fractions of the radiation in the output plane in accordance with the design intent by reducing the phase discontinuities between the phase step and the phase regions surrounding the step, as shown in FIG. 60. FIG. 61 shows the three-dimensional intensity distributions of the transformed output field produced in the output plane 206 in accordance with the second embodiment of the present invention, and corresponding to the second element 205 radial aperture of 80.0 mm.

Third Embodiment:

The third embodiment of the present invention is designed to transform optical field distributions produced by optical systems containing multiple spatially distributed apertures. The optical layout of the third embodiment is presented schematically in FIG. 62. The optical layout contains an optical system 300 composed of a segmented primary mirror and a secondary mirror 307. The primary mirror of the optical system 300 is comprised of six off-axis segments 301 through 306. Radiation collected by the segments 301 through 306 is reflected onto the secondary mirror 307 and is then redirected by the secondary mirror onto an image plane, where the PSF is produced. The image plane location depends on the location of an object or light source with respect to the optical system 300. For the purpose of the following discussion, we assume that objects are located at infinity, and therefore the image plane is located in the back focal plane of the optical system 300.

The optical layout in FIG. 62 also shows an optical system 310 employed to transform the PSF distributions of the optical system 300. The optical system 310 contains four optical components: a diffractive structure 311 located at the back focal plane of the optical system 300, a lens 312 with positive optical power located along the propagation direction at a front focal distance from the diffractive structure 311, a phase structure 313 located along the propagation direction in the back focal plane of the lens 312, and a lens 314 with positive optical power located along the propagation direction after the phase structure 313. The lens components 312 and 314 jointly form an optical system that re-images the focal plane of the optical system 300 onto the output plane 315.

The axial distance between the phase structure 313 and the lens 314 can be adjusted based on the packaging considerations for a desired application. To keep the system's layout compact, the optical components 313 and 314 are placed in proximity to each other. The transformed field is produced in the output plane 315 coinciding with the back focal plane of the lens 314. An optional third phase structure, not shown in FIG. 62, can be placed into the optical path prior to the optical system 300 to compensate for the wavefront distortions of the incoming radiation. Although the optical components 311 through 314 are shown in FIG. 62 as transmissive, the optical system 310 may also contain reflective phase modulating components and mirrors.

The incoming radiation propagates through the diffraction-limited optical system 300 with distributed apertures and forms an image in the back focal plane. An image of a point source will produce a PSF distribution in the back focal plane of the optical system 300. The diffractive structure 311 of the optical system 310 is placed in the back focal plane of the optical system 300. The structure 311 diffracts a fraction of the PSF field by introducing localized phase discontinuities to the field in the back focal plane of the optical system 300. The diffracted and non-diffracted fractions of the optical field further propagate through the lens element 312 with positive optical power located at the front focal distance from the diffractive structure 311. The lens element 312 modifies the wavefront curvature of the optical field and produces a Fraunhofer diffraction pattern of the optical field modified by the diffractive structure 311. The phase structure 313 is placed within the Fraunhofer diffraction region after the lens element 312. The phase structure 313 further modifies the Fraunhofer diffraction pattern by introducing controlled optical path differences to the fractions of the optical field. The axial distance between the lens element 312 and the phase structure 313 can be adjusted based on the packaging considerations. In the case of an optical system 310 employing reflective phase structures, the axial distance between the lens element 312 and the phase structure 313 needs to be long enough to prevent obstruction of the reflected field by the lens element 312.

In accordance with the third embodiment, the phase structure 313 is placed in the back focal plane of the lens 312. In alternative implementations, this axial distance between the lens 312 and the phase structure 313 can be chosen differently. In applications requiring the most compact implementation, the phase structure 313 can be placed in proximity to the lens element 312, although this selection may cause some reduction in the fractional power contained within the central node of the transformed output field.

The optical field modified by the phase structure 313 propagates through the lens 314 with positive optical power, located after the phase structure 313. The axial distance between the phase structure 313 and the lens element 314 can be adjusted based on the packaging considerations. In applications requiring the most compact implementation, the lens element 314 can be placed in proximity to the phase structure 313. The lens 314 modifies the field curvature and transfers the modified Fraunhofer diffraction pattern to the far field distribution in the back focal plane 315. The controlled optical path modifications by the phase structure 313 in the Fraunhofer diffraction region produce coherent interactions of the field in the output plane 315 and result in PSF shape transformations.

The primary mirror aperture of the optical system 300, in accordance with the third embodiment, is comprised of six input apertures defined by the concave mirror segments 301 through 306, where each segment aperture is 30 mm in diameter. The six mirror apertures are uniformly spaced in the azimuthal direction, with the centers of the apertures located on the circumference of a circle with a radius of 50 mm. The six concave mirror segments 301 through 306 comprise a larger concave aspheric mirror with a radius of 1484.4 mm and a conic constant of −0.63877. The secondary convex mirror is spherical with a radius of 2654.9 mm. The primary and secondary mirror vertices are spaced 400 mm apart, and the back focal plane of the system is located along the optical axis 461 mm from the vertex of the secondary mirror. The effective focal length of the optical system 300 with distributed apertures is $f_{Eff}$=1000 mm.

When the wavefront of the optical field has no distortions and the radiation reflected from all six mirrors 301 through 306 is in-phase, the resulting PSF intensity distribution in the back focal plane of the optical system 300 has the shape shown in FIG. 63. For the propagating radiation with a wavelength of 1 micron, the central node radius of the PSF in the back focal plane of the optical system 300 is approximately 7.5 microns.

The optical system 310 is placed following the optical system 300 in order to transform the PSF field distributions produced by the optical system 300. The lenses 312 and 314 contained within the optical system 310 have focal lengths of $f_1=f_2=100$ mm. The diffractive structure 311 is placed in the back focal plane of the optical system 300, and contains a circular-shaped phase discontinuity with a radius of 7.3 microns. The diffractive structure 311 is centered with respect to the optical field in the back focal plane of the optical system 300. The circular-shaped phase step of the structure 311 diffracts a fraction of the PSF field produced in the back focal plane of the optical system 300 by introducing a localized optical path difference of OPD=0.5λ. When the diffractive phase structure 311 is fabricated in the form of a phase relief pattern, the height of the phase steps h within the substrate of the diffractive phase structure 311 is calculated based on equation (3). For the phase structure 311 made of BK7 glass with a refractive index of n=1.5075 at the wavelength of λ=1 micron, the step height h corresponding to an OPD=0.5λ will be 0.9852 microns. FIG. 64 shows the phase distribution of the optical field in the back focal plane of the optical system 300 after modification by the diffractive phase structure 311.

FIGS. 65 and 66 present the respective intensity and phase distributions of the optical field modified by the diffractive structure 311 in the Fraunhofer diffraction region after propagation through the lens 312. FIGS. 65 and 66 indicate that both the intensity and phase distributions of the optical field in the Fraunhofer diffraction region are spatially non-uniform. The phase structure 313 contains six circular-shaped phase discontinuities arranged in a pattern shown in FIG. 67. The phase discontinuities of the phase structure 313 introduce localized optical path differences of OPD=0.5λ to the fractions of the radiation in the Fraunhofer region. The phase discontinuities of the phase structure 313 are oriented in the azimuthal direction to coincide with the hexagonal phase pattern of the field in the Fraunhofer region shown in FIG. 66. The radii of the phase discontinuities shown in FIG. 67, as well as their radial distances from the optical axis, match the size and shape of the phase pattern shown in FIG. 66. The phase discontinuities of the phase structure 313, in accordance with the third embodiment, have aperture centers uniformly spaced along the circumference of a circle with a radius of 5 mm, and have the radii of the individual phase discontinuities equal to 1.5 mm. For the propagating radiation with a wavelength of $\lambda=1.0$ micron and the phase relief structure 313 made from a BK7 glass substrate, the heights h of the pattern phase relief steps fabricated onto the phase structure 313 are equal to h=0.9852 microns.

FIG. 68 shows the resulting phase distribution in the Fraunhofer diffraction region after modification by the phase structure 313 containing the phase pattern shown in FIG. 67. The optical path differences produced by the phase structure 313 reduce the optical field phase discontinuities in the Fraunhofer diffraction region, as shown in FIG. 68, without affecting the field amplitude. OPDs produced by the phase structure 313 result in coherent interactions between the fractions of radiation in the output plane 315 of the optical system 310. FIGS. 69 and 70 show the three-dimensional intensity distributions of the transformed field produced in the output plane 315 and corresponding to different f-numbers of the optical system 310. The f-number of the optical system 310 depends on the radial size of the optical field within the Fraunhofer region, as well as the focal lengths of the lenses 312 and 314. In accordance with the third embodiment, the f-number was adjusted by changing the radial size of the optical field within the Fraunhofer region. The optical field radial size was adjusted by changing the radial aperture size of the optical components 312, 313, or 314. FIG. 71 shows the relative axial cross-sections of the irradiance distributions produced in the output plane 315 for three different field radii of 50.0 mm, 11.6 mm, and 8.0 mm. The three transformed output field distributions shown in FIG. 71 contain respectively 94.5%, 93.5%, and 86.0% of the propagating radiation power within the 15 microns diameter central node. The fractional power contained within the central node of the transformed field significantly exceeds the fractional power of 20.7% contained within the central node of the original PSF in the back focal plane of the optical system 300.

To increase the transformed field central node peak irradiance in the output plane 315, the phase structure 313 is comprised of an additional doughnut-shaped phase step, as shown in FIG. 72. The OPDs produced by the phase structure 313 containing the additional doughnut-shaped phase step further reduce the phase discontinuities of the modified field within the Fraunhofer diffraction region, as shown in FIG. 73. The OPDs produced by the second phase structure 313 with the additional doughnut-shaped phase step further enhance constructive coherent interactions between the fractions of radiation as they propagate to the output plane 315 of the optical system 310. FIGS. 74 and 75 show three-dimensional intensity distributions of the transformed field produced in the output plane 315 and corresponding to the respective lens 314 aperture radii of 50.0 mm and 8.0 mm limiting the field in the Fraunhofer diffraction region. FIG. 76 shows the relative axial cross-sections of the transformed field irradiance distributions produced in the output plane 315 for the three different lens 314 limiting aperture radii of 50.0 mm, 11.6 mm, and 8.0 mm. The three output field distributions shown in FIG. 76 contain respectively 94.9%, 94.6%, and 87.1% of the radiation power within the 15 micron diameter central node of the transformed field. FIG. 77 shows the relative irradiance cross-sections of the transformed field distributions produced in the output plane 315 employing the lens 314 with a 50.0 mm limiting aperture radius and the phase structure 313 with and without the addition of the doughnut-shaped phase step, respectively. The addition of the doughnut-shaped phase step to the phase structure 313 enhances the constructive coherent interactions between the field fractions in the output plane 315 and results in a 50% increase in the transformed field peak irradiance.

The size of the central node of the transformed field produced in the output plane 315 is proportional to the phase step size of the diffractive structure 311 and to the absolute magnification value of the optical system 310. The absolute magnification value, in turn, is proportional to the focal length $f_2$ of the lens 314, and is inversely proportional to the focal length $f_1$ of the lens 312.

In the presence of wavefront distortions of the radiation propagating through the optical system 300, the shape of the PSF produced in the focal plane will also be distorted, as shown in FIGS. 11 and 12. The fractions of propagating radiation contained within the central node of the distorted PSFs will be reduced as compared to the respective fraction of the non-distorted PSF. FIGS. 78 through 81 present the intensity and phase distributions of the PSF produced in the focal plane of the optical system 300 in the presence of wavefront distortions of the incoming radiation. The field distributions shown in FIGS. 78 and 79 correspond to the respective PSF irradiance and phase distributions in the back focal plane of the optical system 300 in the presence of random optical path difference errors between the primary mirror segments 301 through 306 ranging from $-0.14\lambda$ to $0.15\lambda$ and listed in the second row of Table 1. The field distributions shown in FIGS. 80 and 81 correspond to the respective PSF irradiance and phase distribution in the back focal plane of the optical system 300 in the presence of random OPD errors between the primary mirror segments 301 through 306, ranging from $-0.35\lambda$ to $0.21\lambda$, and listed in the third row of Table 1. The fractional PSF powers contained within the PSF central node in the presence of the OPD errors listed in the second and third rows of Table 1 are 17.7% and 12.9%, respectively.

Transformations of the distorted PSFs shown in FIGS. 78 through 81 significantly increase the fractional power contained within the central node of the transformed output field in the output plane 315. The fractional radiation power contained within the central node of the transformed field depends on the lateral field size in the Fraunhofer diffraction region. When the radial size of the field in the Fraunhofer region is limited to 50.0 mm and the phase steps of the phase structures 311 and 313 introduce localized optical path differences OPD=$0.5\lambda$, the transformed output field contains within the 15 microns diameter central zone approximately 78% of the radiation power for the phase distortions listed in the second row of Table 1, and approximately 68% of the radiation power for the phase distortions listed in the third row of Table 1.

An additional increase in the fractional radiation power contained within the central zone of the transformed output field, and the associated increase in peak irradiance of the transformed field, can be achieved by adjusting the OPDs of the phase structures 311 and 313. The increase in the transformed field peak intensity and the fractional power contained within the central node of the transformed field is achieved by reducing the phase discontinuities between the different fractions of the propagating field in the Fraunhofer diffraction region. This can be accomplished by employing electronically controlled high resolution spatial phase modulators (SPMs) in place of the phase structures 311 and 313. The SPMs are controlled through a feedback loop by monitoring the fractional power contained within the central node of the field and by applying an optimization algorithm to maximize the fractional power. An optimization algorithm, known as Stochastic Parallel Gradient Descent (SPGD), was disclosed in the past to solve similar problems.

Table 3 shows the OPDs produced by the individual phase steps of the phase structure 313 employed to maximize the fractional power encircled within the 15 micron diameter central zone of the transformed field in the output plane 315. The numerical notation for the individual phase steps of the phase structure 313 in Table 3 is based on FIG. 9.

TABLE 3

| | Aperture Number | | | | | |
|---|---|---|---|---|---|---|
| | 1 | 2 | 3 | 4 | 5 | 6 |
| OPD set #1 ($\lambda$) | 0.47 | 0.38 | 0.49 | 0.53 | 0.32 | 0.54 |
| OPD set #2 ($\lambda$) | 0.44 | 0.60 | 0.27 | 0.38 | 0.42 | 0.34 |

The maximum fractional power of the transformed field encircled within a 15 micron diameter central zone in the presence of the random phase errors listed in the second row of Table 1 is achieved when the OPD produced by the diffractive structure 311 phase step is adjusted to OPD=0.463$\lambda$ and the phase step OPDs of the phase structure 313 are adjusted to the values of OPD set #1 listed in Table 3. FIG. 82 presents the phase distribution in the Fraunhofer diffraction region located after the lens 312 prior to the OPDs produced by the phase structure 313. FIG. 83 presents the phase distribution in the Fraunhofer diffraction region after the localized OPD modifications produced by the phase structure 313 corresponding to OPD set #1 listed in Table 3. The delays produced by OPD set #1 of the phase structure 313 reduce the phase discontinuities within the Fraunhofer diffraction region, as shown in FIG. 83, without affecting the field amplitude. For the lens 314 with an aperture radius of 50.0 mm, the 15 micron diameter central zone of the transformed field contains in the output plane 315 about 86.4% of the PSF power.

The maximum fractional power of the transformed field encircled within a 15 micron diameter central zone in the presence of the random phase errors listed in the third row of Table 1 is achieved when the OPD of the phase step of the diffractive structure 311 is adjusted to 0.459$\lambda$, and the phase step OPDs of the second phase structure 313 are adjusted to the values of OPD set #2 listed in the third row of Table 3. FIG. 84 presents the phase distribution of the radiation in the Fraunhofer diffraction region produced prior to the phase structure 313. FIG. 85 presents the phase distribution of the radiation in the Fraunhofer diffraction region after the localized OPD modifications produced by the phase structure 313 corresponding to OPD set #2 listed in Table 3. The optical path differences produced by OPD set #2 of the phase structure 313 reduce the phase discontinuities within the Fraunhofer region, as shown in FIG. 85, without affecting the field amplitude. For a lens 314 with an aperture radius of 50.0 mm, the 15-micron diameter central zone of the transformed field contains in the output plane 315 about 77.2% of the PSF power.

An increase in the transformed output field fractional power and the peak intensity can also be achieved by minimizing the wavefront distortions of the propagating wavefront at the input of the optical system 300. This is achieved by employing an additional phase structure with spatially adjustable phase regions prior to the optical field entering the optical system 300. This phase structure can also be composed of multiple phase regions controlled through a feedback loop by applying an optimization algorithm.

Additional control over the shape of the transformed output field is achieved by employing diffractive phase structures 311 containing complex phase patterns that introduce OPDs to the optical field. FIGS. 86 through 91 present the formation of the transformed output field with three dominant peaks employing the diffractive structure 311 containing multiple OPD regions. FIG. 86 presents a phase distribution of the diffractive structure 311 composed of three circular regions introducing localized OPDs and arranged into an equilateral triangular pattern with the side lengths of 23 microns between the centers of the circular regions. The triangular pattern of the diffractive structure 311 is centered with respect to the optical field produced in the focal plane of the optical system 300. The individual regions of the diffractive phase structure 311 are similar in shape to the circular phase pattern shown earlier in FIG. 17, and have the radial size of 7.3 microns. The regions of the phase structure shown in FIG. 86 produce an optical path difference of OPD=0.5$\lambda$ to the optical field. FIG. 87 presents the phase distribution of the optical field after modifications by the diffractive phase structure 311 containing the phase pattern shown in FIG. 86. FIGS. 88 and 89 show the respective intensity and phase distributions of the field diffracted by the phase structure 311 in the Fraunhofer diffraction region prior to entering the second phase structure 313. The second phase structure 313 contains six circular-shaped phase steps arranged in a pattern shown in FIG. 67. The phase steps of the phase structure 313 produce localized optical path differences of OPD=0.5$\lambda$ and are oriented to match the hexagonal phase pattern in the Fraunhofer region shown in FIG. 89. The radii of the individual phase steps of the phase structure 313 are 1.5 mm and are uniformly spaced in the azimuthal direction, and the aperture centers are located on the circumference of a circle with a radius of 5 mm. FIG. 90 shows the phase distribution in the Fraunhofer diffraction region after phase modifications by the phase structure 313. FIG. 91 shows the three-dimensional intensity distribution of the transformed field in the output plane 315. The three-dimensional intensity distribution in FIG. 91 corresponds to a 100.0 mm radial aperture size of the lens 314. The intensity distribution of the transformed output field within the output plane 315 contains three dominant intensity peaks arranged in a triangular pattern. The pattern of the peaks corresponds to the phase step pattern of the diffractive structure 311 rotated by 180 degrees with respect to the optical axis. The scale of the resulting pattern in the output plane 315 depends on the magnification of the imaging optical system 310 defined by the focal lengths of the lens components 312 and 314. In accordance with the third embodiment of the present invention, the imaging optical system 310 has a magnification of M=−1. Therefore, the three output peaks of the transformed field are arranged into an equilateral triangular pattern with the peak centers spaced 23 microns from each other. The three output peaks of the transformed field shown in FIG. 91 contain about 75% of the total PSF field power.

Amplitude diffractive structures can also be employed to perform field transformations in accordance with the present invention. Although the use of amplitude diffractive structures causes localized reduction in transmission of the field, and therefore leads to a reduction in power of the transformed output field, the amplitude structures are often simpler to implement than the respective phase structures of a similar size and shape. FIGS. 92 through 96 illustrate the case when an amplitude diffractive structure 311 obstructing a fraction of the PSF produced by the optical system 300 is incorporated as a part of the transforming optical system 310. The amplitude diffractive structure 311 is centered with respect to the optical field produced in the back focal plane 315 of the optical system 310, and has a radius of 0.007 mm. FIG. 92 presents the two-dimensional intensity distribution of the optical field in the back focal plane 315 after the localized field obstruction by the amplitude diffractive structure 311.

FIGS. 93 and 94 show the respective intensity and phase distributions in the Fraunhofer diffraction region after diffraction by the first amplitude structure 311 prior to entering the phase structure 313. The phase structure 313 contains six circular-shaped phase steps arranged in the pattern shown earlier in FIG. 67. The phase steps of the phase structure 313 produce localized optical path differences of OPD=0.5λ and are oriented to match the hexagonal phase pattern in the Fraunhofer region shown in FIG. 94. The radii of the individual phase steps of the phase structure 313 are 1.5 mm and the phase steps are uniformly spaced in the azimuthal direction with aperture centers located on the circumference of a circle with a radius of 5 mm. FIG. 95 shows the phase distribution in the Fraunhofer diffraction region after the phase modifications produced by the phase structure 313. FIG. 96 shows the three-dimensional intensity distribution of the transformed field in the output plane 315. The three-dimensional intensity distribution in FIG. 96 corresponds to a 17.2 mm radial aperture size of the lens 314. Employment of the diffractive amplitude structure 311 reduces the field power contained in the output plane 315 to 68% of the total power of the focused field within the back focal plane of the optical system 300. Employment of the amplitude diffractive structure 311 and the phase structure 313 results in the formation of a field in the output plane 315 shown in FIG. 96. The central peak of the transformed field in FIG. 96 contains about 44% of the total PSF field power. This is more than twice higher than the fractional power contained within the central node of the original PSF in the back focal plane of the optical system 300, containing only 20.7% of the field power as shown in FIG. 10.

Fourth Embodiment:

The optical system in accordance with the fourth embodiment of the present invention is designed to transform optical fields from multiple mutually coherent laser beams into far field distributions with enhanced fractional power contained in the far field central node. Multiple mutually coherent laser beams, known as optical phased arrays (OPAs), are often employed to increase the output laser power. OPAs may contain a varying number of laser beams with different shapes and sizes, and may be arranged into a variety of patterns, including linear, rectangular, circular, etc.

FIG. 97 presents the optical layout of the fourth embodiment of the present invention for producing transformed output field distributions from OPAs. The layout in FIG. 97 contains an OPA 401, a phase structure 402 incorporating several phase shifting elements inserted into the paths of the OPA laser beams, a lens 403 with positive optical power for transferring the OPA radiation into the far field, and an optical system 410. The optical system 410 performs transformation of the OPA far field produced by the lens 403 into a desired output field distribution. The optical system 410 contains a diffractive structure 404 in the form of a phase plate placed in the back focal plane of the lens 403, a lens 405 with positive optical power located in proximity to the diffractive structure 404, a phase structure 406 located in the back focal plane of the lens 405, and a lens 407 with positive optical power placed after the phase structure 406. To reduce the axial length of the optical system 410, the lens 407 is placed in proximity to the phase structure 406.

Although the lenses and the phase shifting components of the optical system 410 are shown in FIG. 97 as refractive elements, reflective phase structures producing optical path delays and mirrors can also be employed instead of their refractive counterparts. The phase structures can be fabricated lithographically onto lenses or mirror elements to reduce the number of individual components within the system. Refractive or reflective electronically controllable spatial phase modulator arrays or individual electro-optical phase modulating elements capable of dynamic adjustments of the OPDs may also be employed to produce the required phase modifications to the optical fields.

The laser beams constituting the OPAs can be expanded and collimated prior to reaching the array of phase shifting elements 402. The shape and size of the OPA laser beams depends on the laser type and the properties of the beam shaping, beam expanding, and collimating optics. For example, a coherent array of expanded and collimated beams may contain a variety of beam shapes including Gaussian, super-Gaussian, top-hat, and doughnut-shaped beams. In accordance with the fourth embodiment, the OPA 401 contains seven Gaussian-shaped coherent laser beams arranged in a pattern shown earlier in FIG. 13. Each Gaussian beam within the OPA 401 has a beam waist radius of 2.83 mm. The beam centers of the six peripheral Gaussian beams are located on the circumference of a circle with a radius of 17 mm and are uniformly spaced at 60° angular increments along the circle.

The incoming array of laser beams constituting the OPA 401 propagates through the array of phase shifting elements 402 and the lens 403, and forms a far field distribution in the back focal plane of the lens 403. The phase shifting array 402 consists of seven individually addressable phase shifting elements with aperture diameters equal to 17 mm and centered with respect to the centroids of the Gaussian laser beams constituting the OPA 401. The array of phase shifting elements 402 is arranged in a pattern shown in FIG. 98, where the phase shifting apertures are individually labeled by numbers 1 through 7 to match the respective Gaussian beams of the OPA as identified in FIG. 13. The array of phase shifting elements 402 provides independent control of OPDs between the individual laser beams prior to propagation through the lens 403. The phase shifting array 402 may be comprised of fast electro-optical phase modulators for real-time compensation of relative OPD fluctuations between the individual laser beams within the OPA 401.

A three-dimensional irradiance distribution of the focused OPA far field produced in the back focal plane of the focusing lens 403, when the OPDs between the individual laser beams within the OPA are zero, was shown in FIG. 14. FIG. 99 shows a two-dimensional irradiance distribution of the focused OPA far field that corresponds to the three-dimensional distribution in FIG. 14. Similar far field shapes and sizes will be produced when the OPDs between the individual laser beams are equal to an integer number j of the emission wavelength OPD=$j\lambda$. In the trivial case of $j=0$, the optical path difference OPD=0, and the individual laser beams of the OPA are in phase. In accordance with the fourth embodiment, the focal length of the focusing lens 403 is $f_1$=1000 mm and the wavelength of the radiation is 0.55 microns. The central node of the far field distribution produced in the back focal plane of the optical element 403 has a radial size of 0.014 mm and contains 55.8% of the total OPA power. The side lobes of the far field contain the remaining 44.2% of the OPA power.

The diffractive structure 404 of the optical system 410 is placed in the back focal plane of the lens 403. The structure 404 diffracts a fraction of the OPA far field in the focal plane of the lens 403 by employing phase patterns that produce localized optical path discontinuities. The diffractive structure 404 may contain a variety of phase patterns, including the patterns shown in FIGS. 16 through 23.

In accordance with the fourth embodiment, the diffractive phase structure 404 contains a single circular-shaped phase step, similar to the phase pattern shown in FIG. 17. The fourth embodiment is designed to increase the fractional power within the central node of the transformed OPA field by coupling a fraction of the far field side lobe power into the central node of the transformed field. The higher fractional powers within the central node of the transformed field can be achieved when the size of the phase step of the diffractive structure 404 does not exceed the size of the central node of the focused far field in the back focal plane of the lens 403. In accordance with the specific implementation, the phase structure 404 contains a circular-shaped phase step with a radial size of 0.007 mm centered with respect to the central node of the focused OPA irradiance distribution produced in the back focal plane of the lens 403. FIG. 100 shows the phase distribution of the focused OPA far field modified by the diffractive phase structure 404. The circular-shaped phase step of the phase structure 404 produces an optical path difference OPD=$0.5\lambda$ to the focused OPA field. When the phase step of the diffractive structure 404 is fabricated as a phase relief pattern, the height of the phase steps h within the phase structure substrate is calculated based on equation (3). For the diffractive structure 404 made from BK7 glass with a refractive index n=1.5185 at the wavelength of $\lambda$=0.55 micron, the step height h corresponding to OPD=$0.5\lambda$ equals 0.53 microns.

In high power laser applications, the power density within the central node of the focused far field distribution in the back focal plane of the optical element 403 may exceed the damage threshold of the diffractive structure 404 coatings or the substrate material. To prevent the radiation damage of the diffractive structure 404, the structure 404 is designed to contain a central opening that equals the size of the central phase step. In accordance with the fourth embodiment, the diffractive structure 404 contains a central opening with a radial size of 0.007 mm, and is shown in FIG. 101. The opening is centered with respect to the central node of the far field produced within the back focal plane of the lens 403. The substrate thickness t of the phase structure 404 is adjusted to produce a controlled OPD to the fraction of the radiation propagating through the substrate. The thickness t is controlled to produce an OPD equal to an odd integer number j of half the wavelengths of the radiation OPD=$t^*(n-1)=j\lambda/2$, where n is the refractive index of the substrate material. The phase structure 404 is made from BK7 glass with a refractive index n=1.5185 at a wavelength of $\lambda$=0.55 microns and has a substrate thickness of 0.340 mm. The phase structure 404 produces OPD=0.176 mm to the OPA radiation with respect to the fraction of radiation propagating through the central opening, corresponding to an integer value of half the wavelengths j=641.

The OPA far field diffracted by the phase structure 404 is further modified by the lens 405 with positive optical power located in proximity to the structure 404. FIG. 102 shows irradiance distribution of the diffracted field in the Fraunhofer diffraction region in the back focal plane of the lens 405. The phase structure 406 is located in the back focal plane of the lens 405 where the Fraunhofer diffraction pattern is produced. The phase structure 406 produces controlled OPDs to fractions of the OPA field in the Fraunhofer diffraction region that result in coherent interactions within the propagating field.

The phase structure 406 contains seven circular-shaped phase steps as shown in FIG. 103. The radius of the central phase step of the phase structure 406 is equal to 0.51 mm, and the radii of the outer phase steps of the phase structure 406 arranged in the hexagonal pattern are equal to 0.60 mm. The phase step centers of the phase structure 406 are uniformly spaced on the circumference of a circle with radius 1.738 mm. The phase steps of the phase structure 406 introduce localized optical path differences of OPD=$0.5\lambda$ to the field within the Fraunhofer region. For a wavelength of the propagating radiation $\lambda$=0.55 micron and the phase structure substrate made of BK7 glass, the height h of the phase relief steps is equal to 0.53 microns. FIG. 104 shows the phase distribution at the output of the phase structure 406. The OPDs produced by the phase steps of the phase structure 406 are designed to reduce the phase discontinuities of the optical field in the Fraunhofer region, as shown in FIG. 104.

A second lens 407 with positive optical power is located in the vicinity of the phase structure 406. In accordance with the fourth embodiment, the focal lengths of the lenses 405 and 407 are equal to each other $f_2=f_3$=100 mm. The transformed output field is produced in the far field with respect to the lens element 407. The shape of the transformed field produced at the output of the lens 407 depends on the lateral size of the field propagating through the lens 407. The lateral size of the field at the output of the lens 407 can be controlled by placing a limiting aperture within the field. FIGS. 105 and 106 present three-dimensional output radiance distributions for the lens 407 aperture radii of 12.7 mm and 8.7 mm, respectively. FIG. 107 shows the relative cross-sections of the output radiance distributions for three respective lens 407 aperture radii of 12.7 mm, 8.7 mm, and 5.3 mm. The three output far field distributions shown in FIG. 107 contain within their respective central nodes 77%, 75%, and 70% of the total OPA power, respectively. The fractional power within the central node of the transformed output radiation exceeds the fractional power within the central node of the OPA far field produced in the back focal plane of the lens 403, which contained 55.8% of total OPA power.

Fifth Embodiment:

The optical system in accordance with the fifth embodiment of the present invention is designed to transform far field distributions from multiple mutually coherent laser beams comprising an OPA into far field distributions with enhanced fractional power contained within the field central node. The transformed far field distribution is produced at a specific working distance from the optical system.

FIG. 108 presents the layout of the optical system in accordance with the fifth embodiment of the present invention. It contains an array of collimated incoming laser beams 501 comprising the OPA, a phase structure 502 for adjusting phase distributions of the collimated OPA beams, an optical system 500 with positive optical power for producing the OPA far field in the back focal plane, and an optical system 520 for transforming the OPA far field.

The OPA 501 in accordance with the fifth embodiment is comprised of seven Gaussian-shaped coherent laser beams arranged in the beam pattern shown earlier in FIG. 13. Each Gaussian beam within the OPA 501 has a beam waist radius of 2.83 mm and a wavelength of 0.55 micron. The 6 peripheral Gaussian beams are located on the circumference of a circle with a radius of 17 mm. The Gaussian beam centers are uniformly spaced at 60 degree angular increments in the azimuthal direction. The incoming array of laser beams 501 propagates through the diffraction-limited optical system 500, and forms the far field distribution in the back focal plane of the optical system 500. The phase structure 502 is placed prior to the optical system 500 to adjust the wave fronts of the OPA beams, as well as OPDs between the individual beams comprising the OPA.

The lens system 500 shown in FIG. 108 is designed to have a compact axial size with a long effective focal length intended to reduce the far field power density at the phase element 505 below its damage threshold. The effective focal length of the lens system 500 is longer than the axial length of the lens system. The optical system 500 is composed of a first lens element 503 with positive optical power and a second lens element 504 with negative optical power spaced along the optical axis, and has an effective focal length of 1000 mm. The first lens element 503 has a focal length of 68.00 mm and the second lens element 504 has a focal length of −14.59 mm. The lens elements 503 and 504 are spaced 54.40 mm along the propagation direction. The back focal plane of the composite lens 500 is located 200.00 mm after the second lens element 504. The axial distance from the first lens element 503 of the optical system 500 to the back focal plane is equal to 254.40 mm, and is approximately four times shorter than the effective focal length of the composite lens system 500.

When the wavefront distortions and OPDs of the laser beams comprising the OPA 501 are compensated for by the phase structure 502, the far field intensity distribution in the back focal plane of the diffraction-limited optical system 500 contains a central node with a radius of 0.014 mm and 55.8% of the OPA power. The remaining 45.2% of the far field OPA power is contained within the numerous radiation nodes diffracted outside of the central node. In the presence of the wave front distortions and random OPDs between the OPA beams, the shape of the far field distribution in the back focal plane of the lens system 500 will be distorted. FIG. 109 shows the irradiance distribution produced in the back focal plane of the optical system 500 in the presence of random OPDs between the individual laser beams. The field distribution in FIG. 109 corresponds to random phase errors between the OPA beams ranging from −0.35λ to 0.21λ as listed earlier in Table 2. The fractional of the OPA power within the central node of the distorted OPA far field is reduced to 40.6%, while the fraction of the OPA power within the radiation diffracted outside of the central node is increased to 59.4%.

The optical system 520 modifies the OPA far field in the back focal plane of the optical system 500, and produces the transformed field distribution in the output plane 510. The optical system 520 contains a diffractive phase structure 505 placed into the far field in the vicinity of the back focal plane of the composite lens 500, a lens 506 with positive optical power for producing a Fraunhofer diffraction of the far field diffracted by the structure 505, a phase structure 507 placed after the lens 506 into the Fraunhofer diffraction field, a lens 508 with positive optical power that follows the phase structure 507, and an output plane 510 located in the back focal plane of the lens 508.

The spacing between the optical components 506, 507, and 508 is selected based on the optical layout considerations. When the phase structure 507 is refractive, the lens 508 can be placed in proximity to the phase structure 507 to reduce the axial size of the system, as shown in FIG. 108. If the phase structure 507 is made reflective, axial separation between the phase structure 507 and the lens 508 will be required to prevent field obstruction by the lens aperture. The optical elements 506, 507, and 508 can also be combined into a single optical component that incorporates the functions of the combined elements.

The phase structure 505 diffracts a fraction of the far field by producing localized OPDs within the OPA far field. The diffracted optical field further propagates through the lens element 506 with a positive optical power located at the front focal distance from the phase structure 505. The lens 506 modifies the wavefront curvature of the diffracted field and produces a Fraunhofer diffraction pattern of the field modified by the phase structure 505. The phase structure 507 modifies the Fraunhofer diffraction pattern produced by the lens 506 by producing controlled OPDs to the localized fractions of the field in the Fraunhofer region. The modified field is further directed onto the lens 508 with a positive optical power. The lens 508 modifies the wavefront curvature of the field 509 and produces the transformed optical field in the output plane 510 based on coherent interactions between the diffracted and non-diffracted fractions of the OPA field.

The phase structure 505 diffracts the far field by producing an OPD to a fraction of the OPA far field central node. In accordance with the fifth embodiment, the phase structure 505 contains a circular-shaped phase step with a radial size of 0.011 mm centered with respect to the central node of the far field in the back focal plane of the optical system 500. The circular-shaped phase step produces an optical path difference OPD=0.5λ to a fraction of the focused OPA field. For the phase structure 505 made from BK7 glass with a refractive index of n=1.5185 and an operating wavelength of λ=0.55 micron, the step height h corresponding to the OPD=0.5λ equals 0.53 microns based on equation (3). FIG. 110 presents the phase distribution at the back focal plane of the optical system 500 after propagation through the phase structure 505.

FIGS. 111 and 112 present the respective OPA field irradiance and phase distributions in the Fraunhofer diffraction region produced at the surface of the phase structure 507 after the lens 506. The phase structure 507, in accordance with the fifth embodiment, is composed of a large number of localized transparent phase cells with individually adjustable phases. The localized cells of the phase structure 507 produce localized OPD adjustments within the optical field in the Fraunhofer diffraction region. To maximize the fractional filed power contained within the central node of the transformed field, the phase structure 507 minimizes phase discontinuities within the Fraunhofer diffraction region, resulting in a uniform phase distribution across the field. FIG. 113 presents the phase distribution of the field in the Fraunhofer region after OPD adjustments by the phase structure 507. The reduction in phase discontinuities in the Fraunhofer region can be achieved by controlling the individual localized phase cells of the phase structure 507 through a feedback loop employing optimization algorithms, such as the Stochastic Parallel Gradient Descent (SPGD) algorithm.

The lateral size of the transformed field central node produced in the output plane 510 is proportional to the lateral size of the phase step of the diffractive structure 505 and magnification of the system 520 defined as a ratio of the focal lengths $f_{508}/f_{506}$ of the lens elements 508 and 506. The central node size of the transformed field in the output plane 510 can be adjusted based on the appropriate selection of the focal lengths of the lens elements 506 and 508. When the focal lengths of the lens elements 506 and 508 are equal, i.e. when $f_{506}=f_{508}$, the lateral size of the central node of the transformed field in the output plane 510 is equal to the lateral size of the phase step produced by the phase structure 505. FIG. 114 presents the two-dimensional transformed OPA irradiance distribution within the output plane 510 that correspond to the uniform phase distribution of the modified field in FIG. 113. The phase distribution in FIG. 114 contains 83.5% of the OPA power within the central node of the transformed field with a 0.011 mm radius.

Field modifications by the phase structure 507 can also be employed to control the lateral position of the transformed output field in the output plane 510, as shown in FIGS. 115 through 117. FIG. 115 presents an exemplary phase distribution produced by the second phase structure 507 in the Fraunhofer region. The localized OPDs produced by the cells of the phase structure 507 within the Fraunhofer region result in a phase gradient across the optical field, as shown in FIG. 115. Changes in the magnitude and direction of the phase gradient will result in respective changes in the magnitude and direction of the transformed field displacement within the output plane 510. FIGS. 116 and 117 present the respective two-dimensional and three-dimensional irradiance distributions of the transformed field in the output plane 510 corresponding to the phase gradient shown in FIG. 115. The lateral shift of the central node within the output plane 510, as shown in FIGS. 116 and 117, is a result of the phase modifications produced by the second phase structure 507.

What is claimed is:

1. A method of performing coherent transformations of optical fields, comprising the following steps:
    forming a far field distribution of the input optical field;
    diffracting a fraction of the formed far field by producing localized discontinuities within said far field;
    forming a Fraunhofer diffraction pattern of the diffracted optical field;
    modifying the Fraunhofer diffraction pattern by producing localized optical path differences within the Fraunhofer diffraction pattern; and
    producing the transformed output optical field in the far field with respect to the modified Fraunhofer diffraction pattern.

2. The method according to claim 1, wherein diffraction of said far field is achieved by producing at least one of localized phase discontinuities and localized amplitude discontinuities.

3. The method according to claim 1, further comprising adjusting the localized discontinuities diffracting the formed far field.

4. The method according to claim 3, further comprising adjusting at least one of lateral dimensions, lateral shapes, and lateral positions of the localized discontinuities diffracting the far field.

5. The method according to claim 3, further comprising adjusting at least one of localized optical phase discontinuities and localized amplitude discontinuities.

6. The method according to claim 1, further comprising producing said localized discontinuities in the focal plane of an optical system.

7. The method according to claim 1, further comprising adjusting the produced localized optical path differences within said Fraunhofer diffraction pattern.

8. The method according to claim 1, further comprising producing the localized optical path differences within said Fraunhofer diffraction pattern to reduce optical phase discontinuities within said Fraunhofer diffraction pattern.

9. The method according to claim 1, further comprising producing localized optical path differences within said Fraunhofer diffraction pattern to modify at least one of spatial distributions and lateral positions of the transformed output field.

10. The method according to claim 1, further comprising adjusting the transformed output optical field by modifying the lateral extent of the optical field within the Fraunhofer diffraction region.

11. The method according to claim 1, further comprising producing the transformed optical field in the focal plane of a lens with positive optical power focusing the modified Fraunhofer diffraction pattern.

12. The method according to claim 11, further comprising modifying the lateral size of the transformed optical field by changing the focal lengths of the optical components with positive optical powers.

13. The method according to claim 1, further comprising adjusting the localized discontinuities diffracting the far field to reduce the influence of the input field distortions onto the transformed output field.

14. The method according to claim 1, further comprising adjusting the localized optical path differences within the Fraunhofer diffraction pattern to reduce the influence of the input field distortions onto the transformed output field.

15. The method according to claim 1, further comprising producing additional optical path modifications of the input optical field prior to forming the far field distribution of the input optical field.

* * * * *